United States Patent [19]
Hara

[11] Patent Number: 5,848,269
[45] Date of Patent: Dec. 8, 1998

[54] BRANCH PREDICTING MECHANISM FOR ENHANCING ACCURACY IN BRANCH PREDICTION BY REFERENCE TO DATA

[75] Inventor: Tetsuya Hara, Hyogo, Japan

[73] Assignee: Mitsubishi Denki Kabushiki Kaisha, Tokyo, Japan

[21] Appl. No.: 908,004

[22] Filed: Aug. 11, 1997

Related U.S. Application Data

[63] Continuation of Ser. No. 467,644, Jun. 6, 1995, abandoned.

[30] Foreign Application Priority Data

Jun. 14, 1994 [JP] Japan .................................. 6-131922
Mar. 16, 1995 [JP] Japan .................................. 7-056971

[51] Int. Cl.[6] ...................................................... G06F 9/42
[52] U.S. Cl. ........................... 395/586; 395/584; 395/587; 711/213; 711/214
[58] Field of Search ..................................... 395/580, 586, 395/383, 587, 584; 711/213, 214

[56] References Cited

U.S. PATENT DOCUMENTS

| | | | |
|---|---|---|---|
| 4,858,104 | 8/1989 | Mafsu et al. | 395/587 |
| 4,991,080 | 2/1991 | Emma et al. | 395/382 |
| 5,265,213 | 11/1993 | Weiser et al. | 395/587 |
| 5,423,011 | 6/1995 | Blaner et al. | 395/587 |
| 5,454,117 | 9/1995 | Puziol et al. | 395/800.23 |
| 5,506,976 | 4/1996 | Jaggar | 395/585 |
| 5,507,028 | 4/1996 | Liu | 395/383 |

FOREIGN PATENT DOCUMENTS 63-231627  9/1988  Japan .

OTHER PUBLICATIONS

Scott McFarling, et al, Reducing the Cost of Branches, pp. 396–403, IEEE 1986, Computer Systems Library, Standford University.

*Primary Examiner*—Kenneth S. Kim
*Attorney, Agent, or Firm*—McDermott, Will & Emery

[57] ABSTRACT

A branch predicting apparatus includes a prediction information buffer for supplying prediction information related to branch prediction of a branch instruction, at a same timing as fetching of an instruction fetched before the branch instruction, and a branch predicting mechanism for reading, if necessary, information required for branch prediction from a register file storing a result of operation of an instruction pipeline in accordance with the prediction information supplied from the prediction information buffer, performing branch prediction of the branch instruction by, at the latest, completion of the fetch cycle of the branch instruction, and for outputting a branch prediction signal.

22 Claims, 33 Drawing Sheets

FIG. 11

{ [BRANCH INSTRUCTION PERFORMING COMPARISON WITH 0]

INSTRUCTION n -1  : add   $a, $b, $c
INSTRUCTION n     : bgez  $a, Label }

FIG. 12

{ [COMPARISON · BRANCH INSTRUCTION USING REGISTER VALUE]

INSTRUCTION n -1  : add   $a, $b, $c
INSTRUCTION n     : beq   $a, $d, Label }

| PREDICTION SCHEME BIT | PREDICTION INFORMATION |
|---|---|
| DATA REFERENCE | PREDICTION FETCH DATA REGISTER NUMBER BRANCH PREDICTING OPERATION ETC. |
| HISTORY REFERENCE | HISTORY INFORMATION |

BRANCH PREDICTING MECHANISM FOR ENHANCING ACCURACY IN BRANCH PREDICTION BY REFERENCE TO DATA

This application is a continuation of application Ser. No. 08/467,644 filed Jun. 6, 1995 now abandoned.

BACKGROUND OF THE INVENTION

1. Field of the Invention

The present invention relates to a branch predicting apparatus in a processor and, more particularly, to a branch predicting apparatus for producing disorder of a pipeline caused by branching, in a processor of pipelined architecture.

2. Description of the Background Art

A processor in which execution of a fetch instruction is divided into a plurality of stages, every time processing of one stage (referred to as a cycle) of each instruction is terminated, processing of the next stage of the instruction is started, and simultaneously, processing of that stage of a next instruction is started so as to execute a plurality of instructions simultaneously, is referred to a processor of a pipelined architecture. When pipelined architecture is employed, processing of one instruction is completed not in a time necessary for executing one instruction but in a time necessary for executing one stage of the instruction obtained by dividing the time by the number of stages. Therefore, when considered simply, instruction executing capability of a processor having pipelined architecture is multiplied by the number of divided stages. However, in an actual processor having pipelined architecture, such improvement in the speed of operation is not possible, mainly because of a branch instruction. When there is a branch instruction among instructions to be executed in the pipeline, sometimes it becomes necessary to erase all the instructions which have been already input to the pipeline and to restart execution from an instruction at the branch target address, dependent on the branch target. This is called a stall of a pipeline. When the pipeline is stalled by the branch instruction, instructions which have already been input to the pipeline before the branch takes place are wasted, reducing efficiency in processing.

Therefore, in a processor having pipelined architecture, some prediction is performed to prevent stall of the pipeline caused by the branch instruction, and a stream of instructions is supplied successively to the pipeline in accordance with the prediction. The higher the accuracy of prediction, the smaller the probability of the stall of the pipeline caused by branching, and the smaller the disorder of the pipeline. Thus degradation of the performance can be suppressed. Accordingly, branch prediction must be performed with as high an accuracy as possible.

Branch prediction mainly includes the following methods.

(1) Static branch prediction in accordance with delayed branch method.

(2) Dynamic branch prediction using branch target buffer (BTB).

These are described in S. McFarling, J. L. Hennessy, "Reducing the cost of branches," in Processings of 13th Annual Symposium on Computer Architecture, June 1986, pp. 396–403. These methods utilize the fact that direction of branching of a branch instruction is biased (bias of branching), and prediction is performed in accordance with information obtained from the results of execution in the past.

In the delayed branch method, an instruction on a path having higher probability of branching (likely path) is moved to a delay slot by a compiler, so as to suppress branch penalty. A delay slot refers to an instruction input to the pipeline in a period from fetching of a branch instruction to fetching of an instruction at the branch target of the branch instruction. When there are a plurality of instructions input in this period, the one input immediately after the branch instruction is referred to as a first slot, the one input next is referred to a second slot, and so on. The branch probability used in the delayed branch method is determined based on the result of execution of branching obtained by executing a sample program, for example, before compiling. More specifically, branch prediction of a branch instruction is performed based on the result of execution of a program.

The hit rate of prediction in accordance with the delayed branch method, that is, probability of a delay slot filled by valid instructions is, according to certain data, about 70% with respect to the first slot, and at most 25% with respect to the second slot.

In the BTB method, branch prediction is performed based on the result of execution of a branch instruction. Outline of the prediction procedure in accordance with the BTB method will be described with reference to the figures.

Referring to FIG. 1, in a branch predicting apparatus in accordance with the BTB method is connected to instruction cache 320 and an instruction pipeline 322 of a processor, and it includes a BTB 324 and a branch predicting mechanism 326. Instruction cache 320 is connected to a main memory, not shown, for example, and applies an instruction of a fetch address applied from branch predicting mechanism 326 to instruction pipeline 322. When there is not an instruction of the applied fetch address in instruction cache 320, instruction cache 320 reads the instruction of the address from a main memory, stores the read instruction and at the same time, supplies the instruction to instruction pipeline 322.

BTB 324 stores branch prediction information including past history of a branch instruction, branch target information and so on. To BTB 324, fetch address is applied from branch predicting mechanism 326, misprediction information is applied from instruction pipeline 322, and so on. Branch predicting mechanism 326 accesses BTB 324 simultaneously with fetching of an instruction, reads branch predicting information, perform prediction by applying obtained history information to a certain predicting algorithm, and when the result is a taken prediction (a prediction of taken branching), supplies a branch target address generated from branch target information to instruction cache 320, as a fetch address for the next cycle.

FIG. 2 shows a flow of branch prediction in accordance with the BTB method. Referring to FIG. 2, in a cycle n, an instruction i is fetched, and at the same time, BTB reading is performed. In the latter half of cycle n, branch prediction is performed, and in a cycle n+1, an instruction i+1 is fetched and the BTB reading is performed. In the cycle n+1, branch of the instruction i is solved, and if it is a misprediction, in cycle n+2, an instruction i+2 is fetched and BTB is updated.

Referring to FIG. 3, branch predicting mechanism 326 includes a predicting circuit 330 for predicting whether the branch is a taken branch or not based on history information from BTB 324 (FIG. 1); and a fetch address selecting circuit 332 for selecting a fetch address of a next instruction, based on the result of prediction of predicting circuit 330, information related to misprediction applied from the instruction pipeline (such as an address for refetching in case of a misprediction), a branch target address from BTB 324 (FIG. 1), and a fetch address output immediately before itself.

Predicting circuit 330 performs branch prediction by applying history information to a certain prediction algorithm as mentioned above, and provides a prediction signal indicating whether the result is a taken prediction or not. Basically, fetch address selecting circuit 322 selects a branch target address when the prediction signal indicates a taken prediction, and otherwise, selects the next physical address following last output fetch address.

The BTB method described above performs branch prediction based on history of several executions of a branch instruction in the past. History of how many executions in the past is to be used is determined based on the number of bits of history information held in the BTB.

The prediction hit rate of the BTB method is, according to a simulation, 77% when 2 bit-history and 256 entries (the number of entries in the BTB) are used. In this case, accuracy of prediction is 83%, hit rate of the BTB is 93% according to the result of simulation, and the prediction hit rate is a product of these values.

As described above, the conventional two methods have not so high prediction hit rates. Therefore, a branch prediction method capable of providing higher prediction hit rate is desired. Here, a backward branch which is a conditional branch instruction forming a loop is taken by about 90% (for example, see J. L Hennessy, D. A. Patterson, "Computer Architecture: A Quantitative Approach,", p. 108), and prediction based on the history of the past results of execution is effective. However, probability of branching of a forward branch is about 40% and not biased.

Generally, in a program, processes are often repeated at a conditional branch instruction forming a loop. Therefore, valid prediction of backward branch instruction is considered effective to some extent. However, actually, a condition in the loop is often provided by a forward branch. Such condition is executed same number of times as the execution of the loop. Therefore, it is executed at least the same number of times as the conditional branch instruction forming the loop. Therefore, in order to improve operational efficiency of the pipeline, effective prediction of backward branch only is not sufficient, and effective prediction of forward branch as well is necessary. Since probability of branching of a forward branch is not biased as already mentioned above, branch prediction based on history is not effective.

Accordingly, a method of branching prediction capable of effective prediction even when the branching is not biased as in the case of forward branch, has been desired.

With this respect, Japanese Patent Laying-Open No. 63-231627 discloses the following look ahead control method. Namely, when an instruction not requiring an address calculation and by which a condition code is set is executed, an operation is carried out by an address calculating circuit, which is not used, to calculate a predicted value of a condition code simultaneously with the execution of the instruction. The predicted value of the condition code calculated in the address calculating circuit is passed to a subsequent instruction of which content to be processed is determined by using the condition code, whereby the content to be processed is determined earilier. In such a method, predicted value of the condition code is calculated in parallel, by using the same data as used by that instruction the execution of which sets the condition code. Therefore, probability of correct condition code is considered to be higher as compared with the method based only on the past history.

However, the method disclosed in Japanese Patent Laying-Open No. 63-231627 provides only the predicted value of the condition code. If this is to be applied to branch prediction, branch prediction may be performed by using a subsequent instruction, using the obtained predicted value of the condition code. In this case, the following problem arises.

Referring to FIG. 4, when the control method of the prior art disclosed in Japanese Patent Laying-Open No. 63-231627 is used for branch prediction, a set instruction for setting a condition code is fetched in a cycle 1, and the set instruction is decoded in cycle 2. At the same time, subsequent branch instruction is fetched in cycle 2. The set instruction is executed in cycle 3, and at the same time, predicted value of condition code is calculated and the predicted value is passed to the subsequent branch instruction amid the cycle 3.

However, in cycle 3, the instruction following the branch instruction is fetched. Therefore, even if the condition code is passed to the branch instruction amid cycle 3 and branch is predicted by using the condition code, it is not possible to predict the address of the instruction fetched immediately after the branch instruction. Therefore, the result of branch prediction is used when a further subsequent instruction is to be fetched. This occurs in cycle 4.

However, in the pipelined architecture having such instruction executing cycles as shown in FIG. 4, execution of branching of the branch instruction terminates in the former half of cycle 4. Accordingly, the instruction fetched in cycle 4 can be fetched based on the actual result of branching. In other words, the result of prediction predicted in cycle 3 is not used, and hence branch prediction itself is meaningless. Therefore, the look ahead control method disclosed in Japanese Patent Laying-Open No. 63-231627 cannot be used as it is for branch prediction.

In view of the foregoing, a novel branch predicting apparatus capable of performing branch prediction effective even for a branch instruction not correlated with the history of execution has been desired. In realizing such an apparatus, addition of excessive hardware is not preferred. If possible, existing resources should be utilized. Calculation of branch prediction should preferably be performed in various ways, and branch prediction should preferably be executed at high speed. The speed of branch prediction may be attained at the expense of accuracy in branch prediction to some extent. However, higher accuracy is of course preferred.

Branch prediction by which position of an instruction for setting condition of branching of a branch instruction is not much constrained by resources used by the instruction is preferred. For example, the position of the instruction for setting condition is constrained when the condition of branching is set by the instruction executed immediately before the branch instruction, means such as a register holding the result of operation of the pipeline is used for setting, and therefore the condition for branching is not available before fetching the branch instruction.

Further, it is preferred that such branch prediction is possible for various and many branch instructions including a branch instruction in which branch target address is determined by using a program counter relative or a register reference. Such a branch prediction is preferred that is effective no matter whether the tendency of branching of a branch instruction is related to the result of past execution or not, and that is effective even at the first execution of the branch instruction. Though existing instruction set may be changed to improve accuracy of branch prediction, effective branch prediction with no or minimum change in the instruction set is more preferred. Further, constraint to scheduling of the instruction should be as small as possible.

SUMMARY OF THE INVENTION

Therefore, an object of the present invention is to provide a branch predicting apparatus capable of performing effective branch prediction even when a branch prediction does not have correlation with results of past execution.

Another object of the present invention is to provide a branch predicting apparatus capable of effective branch prediction even when a branch prediction is not correlated with result of past execution, effectively utilizing exiting resources.

A further object of the present invention is to provide a branch predicting apparatus capable of performing effective branch prediction even when a branch instruction does not have correlation with results of past execution, effectively utilizing existing resources and without adding excessive hardware.

An additional object of the present invention is to provide a branch predicting apparatus capable of performing effective branch prediction in accordance with various methods of calculating branch prediction, even when a branch instruction does not have correlation with result of past execution, effectively utilizing existing resources and without adding excessive hardware.

An additional object of the present invention is to provide a branch predicting apparatus capable of performing considerably effective branch prediction at high speed even when a branch instruction is not correlated with result of past execution, without adding excessive hardware.

A further object of the present invention is to provide a branch predicting apparatus capable of performing effective branch prediction even when a branch instruction is not correlated with result of past execution, without much addition of hardware.

A still further object of the present invention is to provide a branch predicting apparatus capable of performing effective branch prediction even when a branch instruction is not correlated with result of past execution, without adding excessive hardware, even when condition for branching is set by an instruction executed immediately before the branch instruction and condition of branching is not available prior to fetching of the branch instruction as means for holding the result of operation of the pipeline is used for the setting.

A still another object of the present invention is to provide a branch predicting apparatus capable of performing effective branch prediction of various branch instruction without adding excessive hardware, even when condition for branching is set by an instruction executed immediately before the branch instruction and the condition for branching is not available prior to fetching of the branch instruction, as means for holding the result of operation of the pipeline is used for the setting.

A still further object of the present invention is to provide a branch predicting apparatus capable of performing effective branch prediction for a branch instruction which is not correlated with result of past execution, utilizing exiting instruction set, without adding excessive hardware.

A still further object of the present invention is to provide a branch predicting apparatus capable of performing effective branch prediction for a branch instruction which is not correlated with result of past execution, including the first execution of a branch instruction, without adding excessive hardware.

A still further object of the present invention is to provide a branch predicting apparatus capable of performing effective branch prediction which can relax as much constraint to scheduling of the instruction as possible, and maintaining as much instruction format as possible.

The present invention relates to a branch predicting apparatus for a processor having pipelined architecture, including branch predicting information supplying apparatus for supplying predicting information related to branch prediction of a branch instruction at a same timing as fetching of an instruction fetched prior to the branch instruction; and a branch predicting circuit for reading, as needed, information necessary for branch prediction from an apparatus storing a result of operation, performs branch prediction of a branch instruction at least by the time of completion of the fetch cycle of the branch instruction and providing a branch predicting signal, in accordance with the predicting information supplied from the predicting information supplying apparatus.

According to the branch predicting apparatus, the predicting information related to the branch prediction of a branch instruction is supplied at the same timing as fetching of an instruction fetched prior to the branch instruction, and branch prediction is performed in accordance with the predicting information. Since there is sufficient time for prediction, it is possible to read information necessary for branch prediction from an apparatus storing the result of operation and use the information for branch prediction, for example information which is actually referred to when the branch instruction takes a branch may be read, as needed. As a result, a branch predicting apparatus capable of performing effective branch prediction even for a branch instruction not correlated with the result of past execution can be provided.

The branch predicting circuit may perform branch prediction based only on a part of a information necessary for branch prediction. As compared with prediction using all the information necessary for branch prediction, prediction can be performed at higher speed. In that case, the branch predicting circuit may further include a compressing circuit for compressing information necessary for branch prediction in accordance with a prescribed manner. The branch predicting circuit performs branch prediction in accordance with the information compressed by the compressing circuit. This enables branch prediction at higher speed, and accuracy in prediction can be improved than when only a part of the information necessary for branch prediction is used.

The branch predicting apparatus may further include a branch predicting mechanism based on history for performing branch prediction of a branch instruction in accordance with the history of the branch instruction, and a history information holding apparatus for holding the history of the branch instruction. When branch prediction by the branch predicting circuit is invalid, prediction by the branch predicting mechanism based on history is available, and therefore branch prediction becomes more accurate.

The predicting information supplying apparatus of the branch predicting apparatus may include a prediction information buffer for temporarily storing predicting information applied from the pipeline. Branch prediction can be performed utilizing the result of processing by the pipeline which is also used in the actual branch processing. As a result, a branch predicting apparatus capable of performing effective branch prediction even for a branch instruction not correlated with the result of past execution can be provided.

The instruction system may be configured to include predicting information of branching, and predicting information supplying apparatus may include an apparatus for extracting predicting information from an instruction and supply the information. Since predicting information can be extracted from the instruction, it is not necessary to prepare a hardware for storing the predicting information. It is not necessary either, to increase the amount of predicting information stored, for higher accuracy of branch prediction.

The branch predicting apparatus may further include a static branch predicting mechanism. Each instruction may include predicting scheme specifying information for specifying scheme of predicting a branch taken with respect to the branch instruction executed next. The predicting information supplying apparatus extracts and supplies the predicting scheme specifying information from the fetched instruction. The branch predicting apparatus may further include a scheme selecting apparatus for selecting either an output from the branch predicting circuit or an output from the static branch predicting mechanism, in response to the predicting scheme specifying information. Either the output from the branch predicting circuit or the output from the static branch predicting scheme is selected in response to the predicting scheme specifying information. Since more suitable predicting scheme can be used for branch prediction dependent on the type of branch instruction, accuracy of prediction can be improved.

A write/read control signal indicating an update request of predicting information when the branch prediction is missed and indicating output information of predicting information when an instruction is fetched, may be applied to the branch predicting apparatus from an apparatus executing the instruction. The predicting information supplying apparatus may include a branch predicting information buffer, an FIFO memory, and a selecting apparatus. The branch predicting information buffer stores, in response to the write/read control signal attaining a value indicating the update request, stores the predicting information applied from the pipeline in a designated address, and responsive to the write/read control signal attaining a value indicating an output request, outputs the predicting information from the designated address. The FIFO memory temporarily and successively stores a prescribed number of addresses of the fetched instruction, and outputs the address in first in first out manner. The selecting apparatus applies, in response to the write/read control signal attaining a value indicating the update request, the output from the FIFO memory to the branch predicting information buffer, and otherwise, applies the address of instruction fetch at present to the branch predicting information buffer. Consequently, in the branch predicting apparatus, when the branch prediction is failed, the branch predicting information buffer stores the predicting information in the address output from the FIFO memory, and at the time of output of the predicting information, provides the predicting information from the address of current instruction fetch.

The address output from the FIFO memory is the address of the instruction actually fetched at every prescribed cycle. Assuming that control is transferred to a certain branch instruction as a result of taken branch of an immediately preceding branch instruction. When branch prediction of said certain branch instruction is missed, predicting information related to said certain branch instruction is stored in the branch predicting information buffer, using the address of the instruction actually fetched at every prescribed cycle as the address. Then, the instruction sequence is executed, and when control is transferred to said certain branch instruction, the address used for reading the branch predicting information from the branch predicting information buffer is the same as that used for storing the predicting information. Therefore, accuracy in prediction of said certain branch instruction can be improved as compared with prediction in which the address for storing in the branch predicting information buffer is not dynamically managed. As a result, highly effective branch prediction is possible even for a branch instruction which is not correlated with the result of past execution.

The branch predicting apparatus in accordance with another aspect of the present invention is a branch predicting apparatus for a processor having pipelined architecture including a plurality of storing apparatuses each storing predicting information associated with branch prediction of a branch instruction; a specific information supplying apparatus for supplying a specifying information for specifying one of the plurality of storing apparatuses that stores the branch predicting information of a certain branch instruction at the same timing as fetching of an instruction fetched before the certain branch instruction; and a branch predicting circuit for reading branch predicting information of a certain branch instruction from that one of the plurality of storing apparatuses which is specified by the specifying information supplied from the specifying information supplying apparatus, performing branch prediction of the certain branch instruction by completion of a fetch cycle of the branch instruction at the latest, and for outputting a branch predicting signal. In the branch predicting apparatus, specifying information for specifying one of the plurality of storing apparatuses that stores branch predicting information of a certain branch instruction is supplied by the specifying information supplying apparatus at the same timing as the fetching of an instruction fetched before the branch instruction. Branch predicting information of the branch instruction is read from that storing apparatus which is specified by the specifying information, and branch prediction of the branch instruction is performed by the completion of the fetch cycle of the branch instruction at the latest. As compared with the operation in which branch predicting information is supplied by an instruction, it is not necessary to fix the position of the instruction for the supply with respect to the branch instruction, and it is not necessary either to add a new field to the instruction for supplying the branch predicting information. As a result, effective branch prediction can be performed while maintaining as much as possible the instruction format and relaxing constraint to scheduling of the instruction.

The branch predicting apparatus in accordance with a still further aspect of the present invention is a branch predicting apparatus for a processor having pipelined architecture, including an immediate value storing apparatus for storing, when a program counter relative branch instruction is executed, an immediate value of offset of the program counter caused by the branch instruction associated with an address of an instruction having prescribed relation with the branch instruction; an apparatus for reading, when there is an immediate value stored in the immediate value storing apparatus associated with the address of the instruction, then, the stored immediate value; and branch predicting circuit for predicting, when the immediate value is read from the immediate value storing apparatus by the apparatus for reading the immediate value, the direction of branching of the branch instruction associated in accordance with the prescribed relation with the instruction fetched by an instruction fetch, in accordance with a prescribed scheme of prediction, and for predicting branch target thereof by using the read immediate value.

In the branch predicting apparatus, simultaneously with an instruction fetch, an immediate value, if any, which is stored in the immediate value storing apparatus associated with the address of the instruction, is read, direction of branching of a branch instruction associated in accordance with a prescribed relation with the instruction fetched by the instruction fetch is predicted, and branch target address is predicted using the read immediate value. The bit length of the immediate value is considerably shorter than the branch target address itself. Therefore, as the amount of hardware for storing information of the branch target can be reduced when the branch target address itself is held as the branch target information.

The branch predicting apparatus in accordance with the additional aspect of the present invention is a branch predicting apparatus for a processor having pipelined architecture, including branch target information storing apparatus for storing calculating method specifying information for specifying, when a branch instruction is executed, a method of calculating branch target of the branch instruction, and branch target calculating information used for calculating the branch target in executing the branch instruction, as branch target information in association with an address of an instruction having a prescribed relation with the branch instruction; an apparatus for reading, simultaneously with an instruction fetch, branch target information, if any, which is stored in the branch target information storing apparatus in association with the address of the instruction; and branch predicting circuit for predicting direction of branching in accordance with a prescribed method, when branch target information is read from the branch target information storing apparatus by the apparatus for reading branch target information, and predicting branch target of the branch instruction associated in accordance with a prescribed relation with the instruction fetched by the instruction fetch, in accordance with a method of calculation specified by the calculating method specifying information of the read branch target information, with respect to the branch target calculating information of the read branch target information.

In the branch predicting apparatus, simultaneously with the instruction fetch, when there is branch target information stored in the branch target information storing apparatus associated with the address of the instruction, the branch target information is read, and direction of branching of the branch instruction associated in accordance with a prescribed relation with the instruction fetched by the instruction fetch is predicted in accordance with a prescribed method. Further, branch target is predicted in accordance with a method of calculation specified by calculating method specifying information of the read branch target information, with respect to the branch target calculating information of the read branch target information. As a result, effective branch prediction can be performed for various branch instructions, without adding excessive hardware.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 schematically shows instruction codes in accordance with the first embodiment.

FIG. 12 schematically shows instruction codes in accordance with the first embodiment.

DESCRIPTION OF THE PREFERRED EMBODIMENTS

Several embodiments of the present invention will be described in the following with reference to the figures. Though not shown in the figures of respective embodiments below, it is assumed that an instruction cache is connected to a main memory, part of the instructions are always held, and when there is not an instruction corresponding to the fetch address, it is read from the main memory. This is the same as in the instruction cache of the prior art.

[First Embodiment]

FIGS. 5 to 18 are related to the branch predicting apparatus in accordance with the first embodiment of the present invention.

Figure 1:
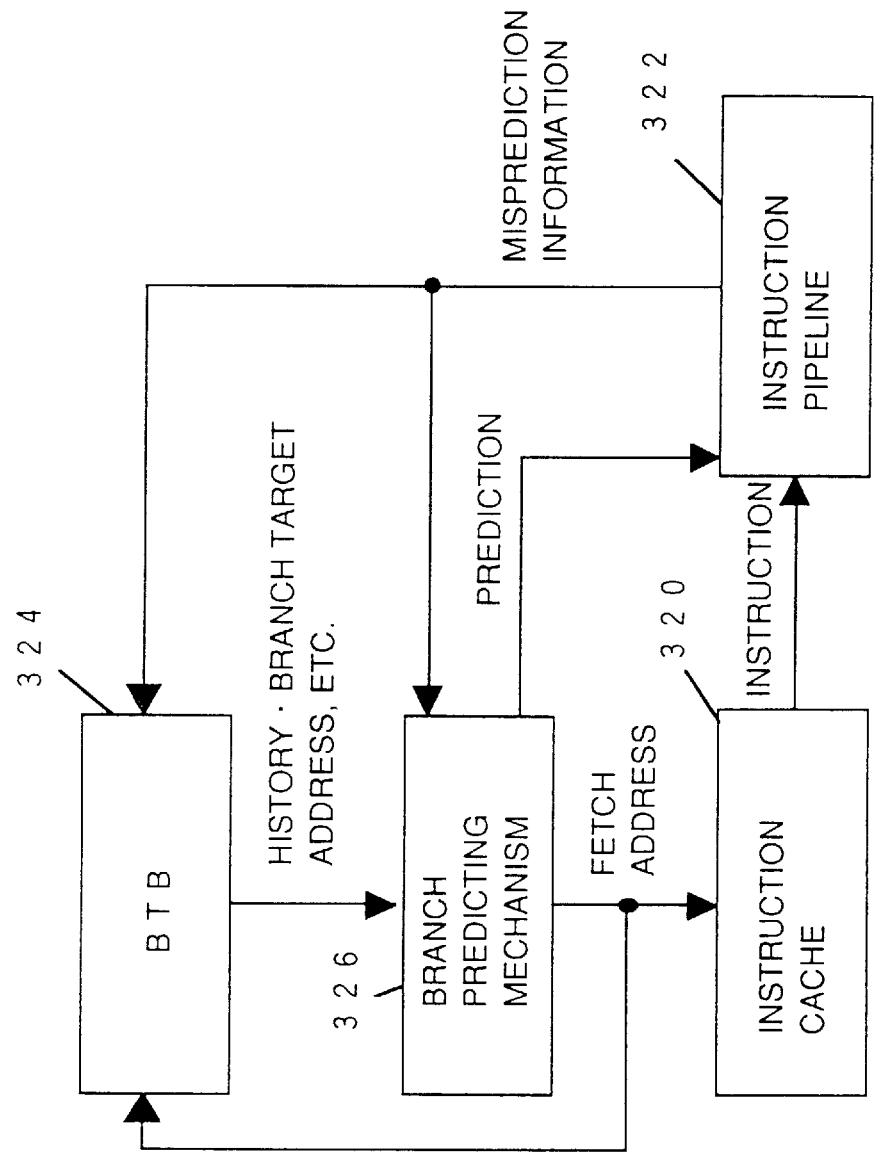
FIG. 1 is a block diagram showing a branch predicting apparatus using conventional BTB method and peripheral circuitry.
Figure 2:
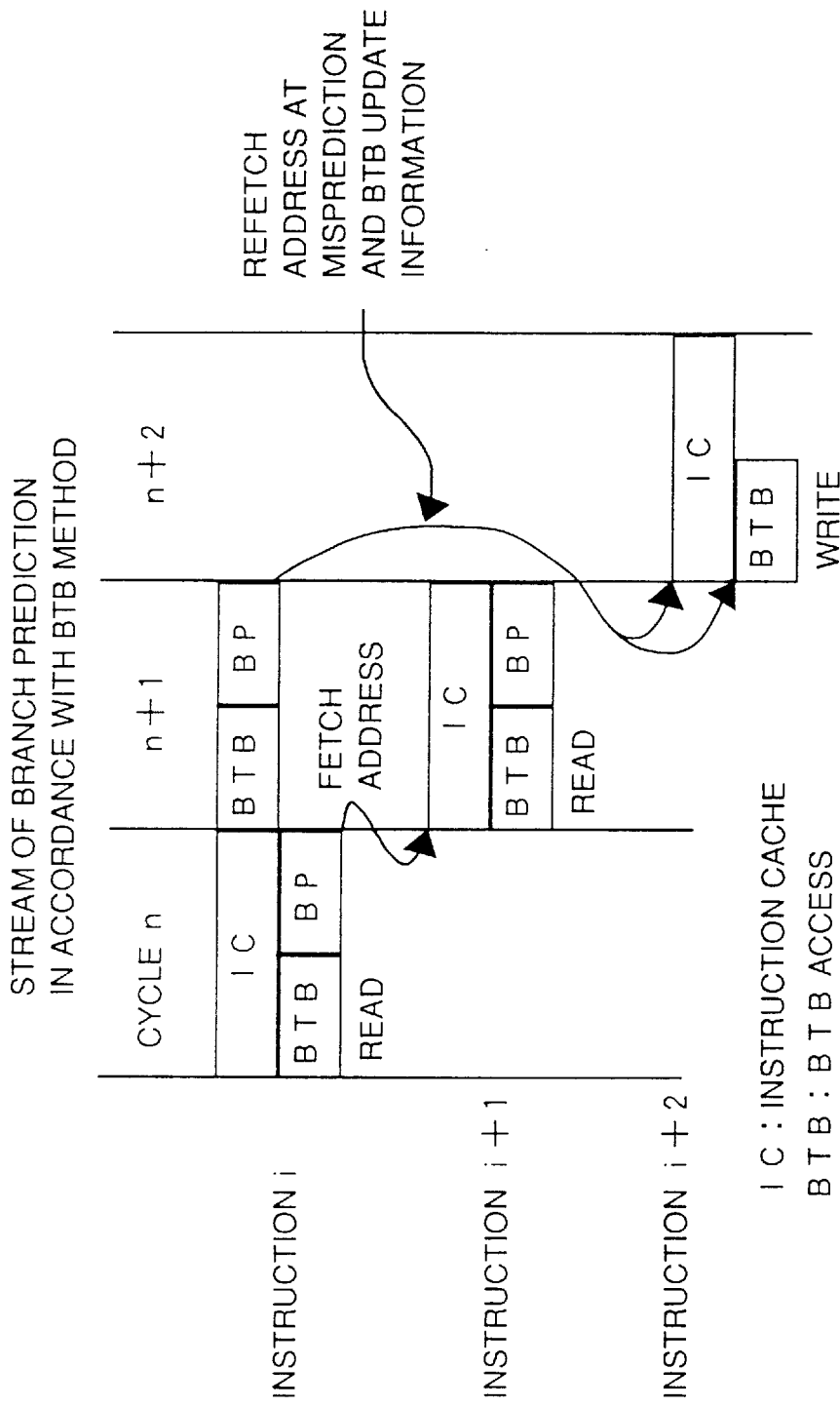
FIG. 2 schematically shows a stream of branch prediction in accordance with the BTB method.
Figure 3:
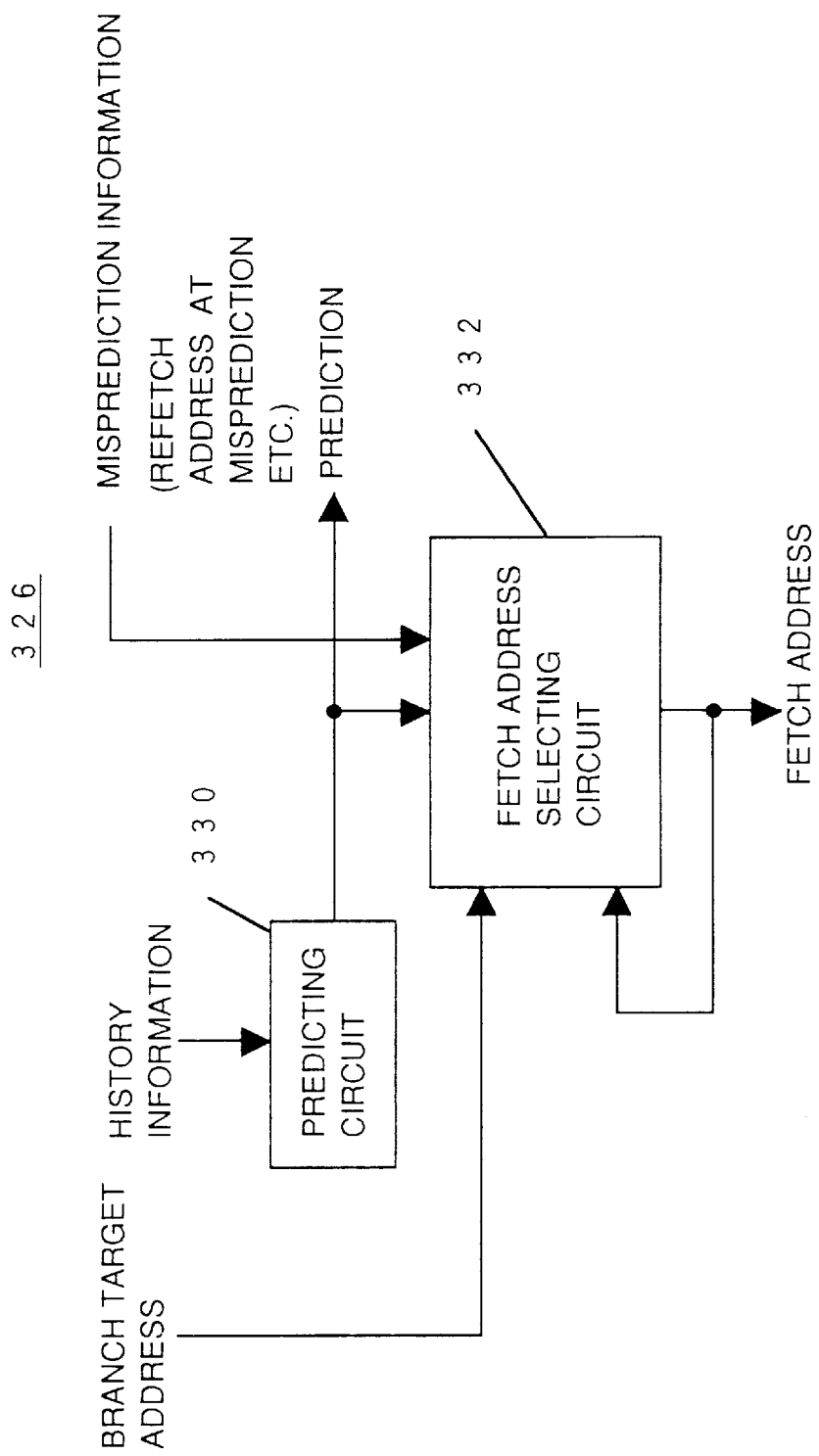
FIG. 3 is a block diagram of a branch predicting mechanism of the apparatus shown in FIG. 1.
Figure 4:
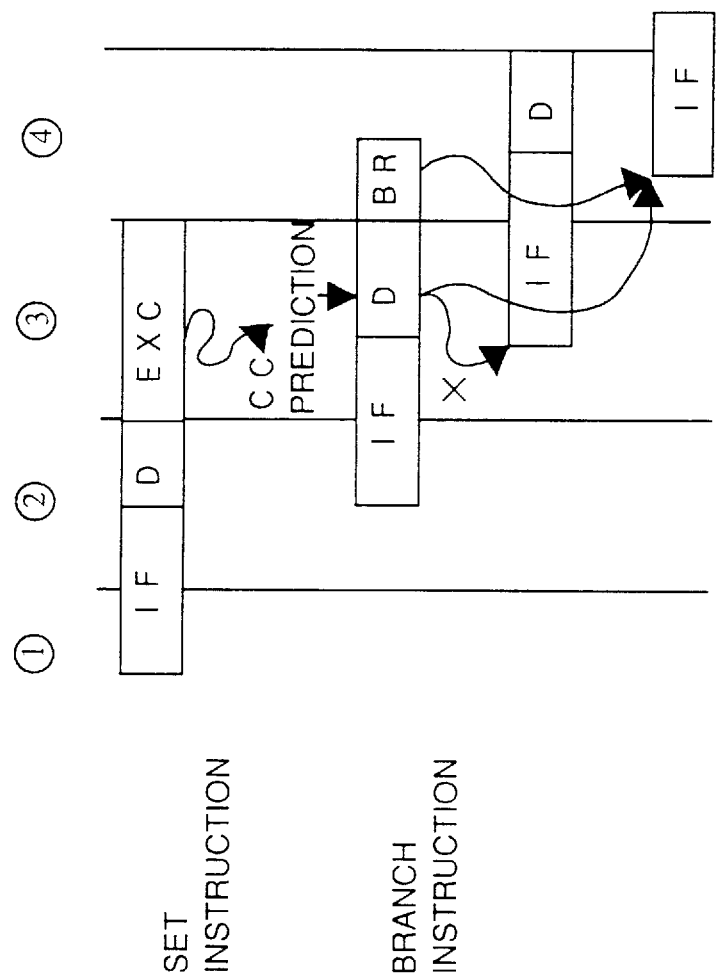
FIG. 4 schematically shows a stream of processing in a conventional method in which condition code is calculated in advance.
Figure 5:
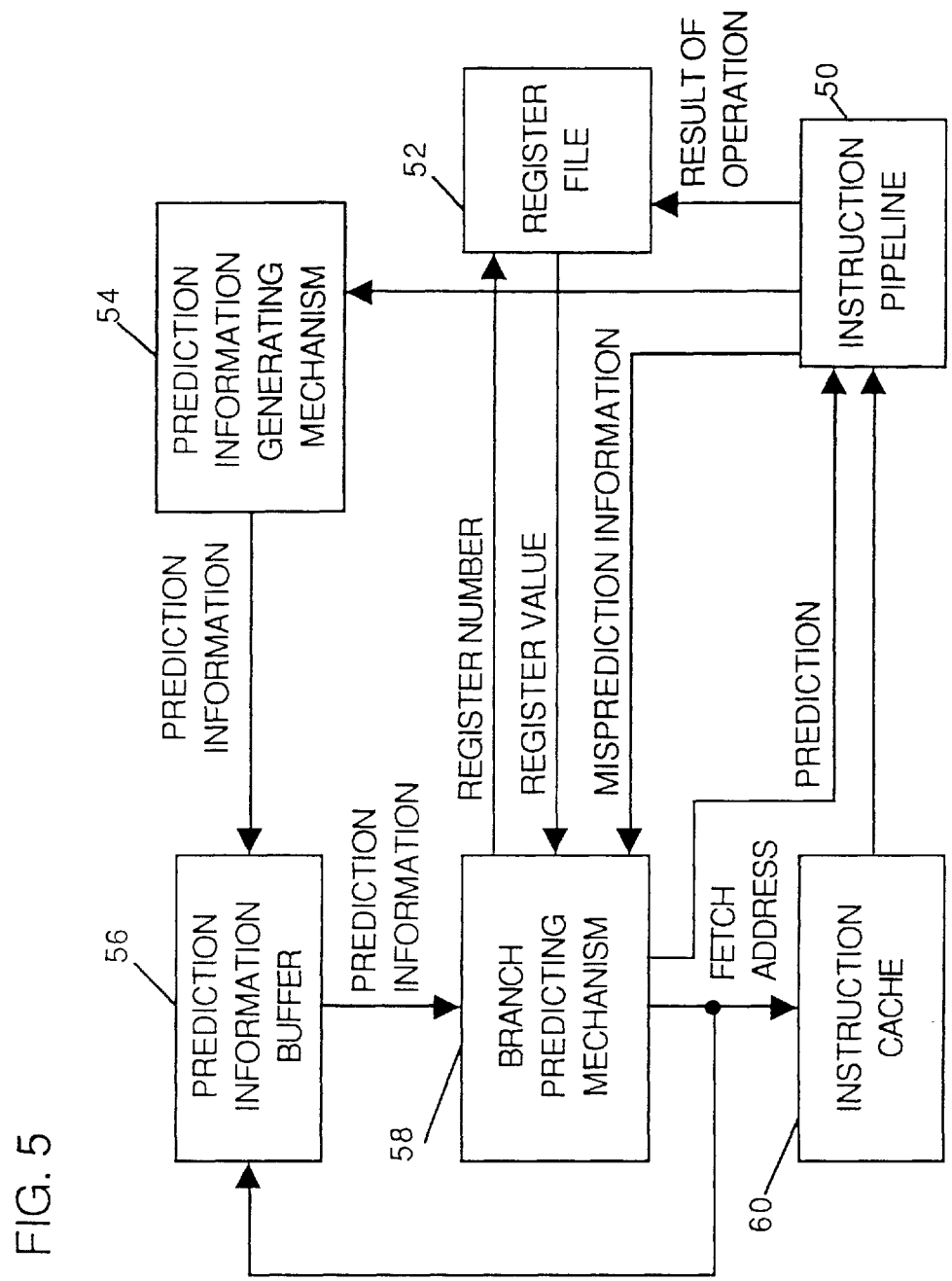
FIG. 5 is a block diagram of a branch predicting apparatus in accordance with a first embodiment of the present invention and peripheral circuitry.

Referring to FIG. 5, the branch predicting apparatus is connected to an instruction cache 60, an instruction pipeline 50, and a register file 52 for storing result of operation of instruction pipeline 50. The branch predicting apparatus includes a prediction information generating mechanism 54 for generating prediction information from information from instruction pipeline 50; a prediction information buffer (56) for temporarily storing a fetch address output from the branch predicting apparatus and the predicting information from predicting information generating mechanism 54; and a branch predicting mechanism 58 for performing branch prediction based on prediction information from prediction information buffer 56, result of operation stored in register file 52, and misprediction information from instruction pipeline 50. Though not shown in FIG. 5, instruction pipeline 50 provides read/write control signal of prediction information buffer 56, and applies the signal to prediction information buffer 56.

The prediction information includes a register number holding a condition or underlying data for determining branching; branch information such as branch condition; and branch target information.

Figure 6:
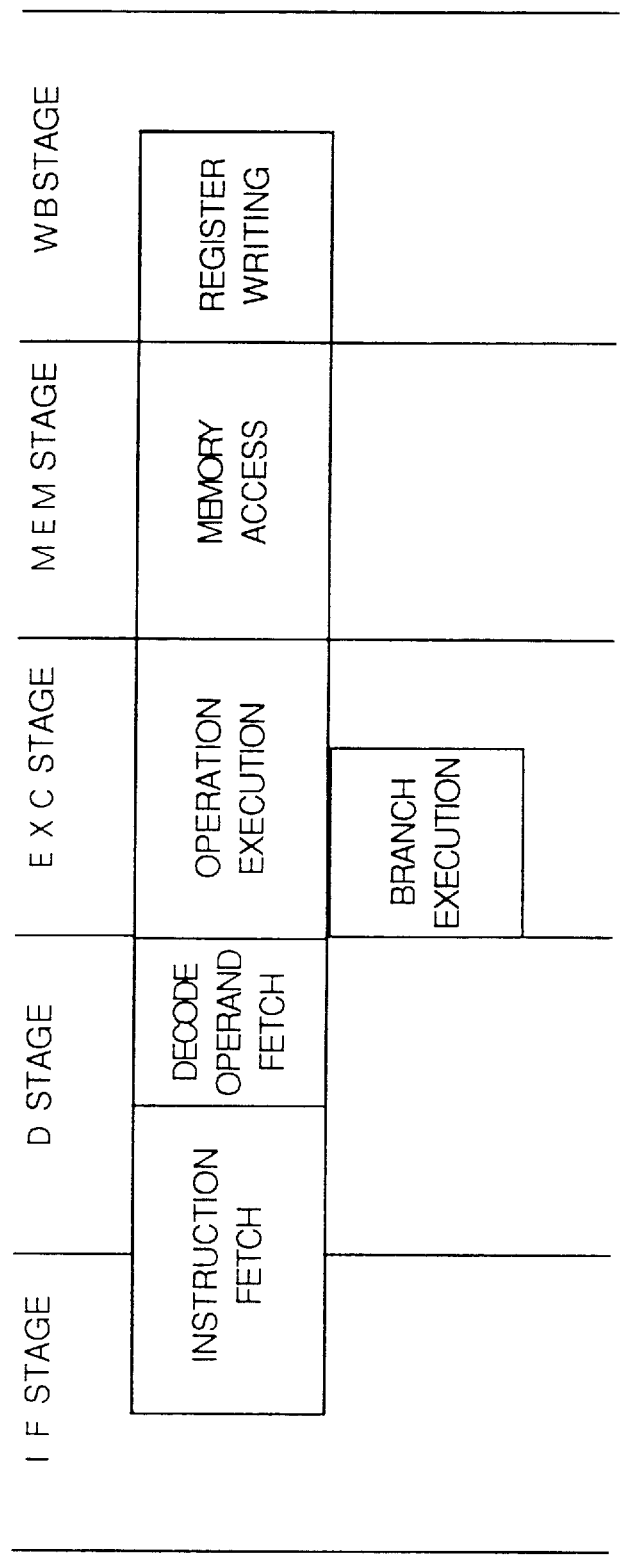
FIG. 6 schematically shows a memory execution stage of the first embodiment.

Instruction pipeline 50 shown in FIG. 5 performs such instruction pipeline processing as shown in FIG. 6. The present invention is applicable not only to such processor that performs this instruction pipeline processing, but also to processors performing other pipeline processing, if appropriately modified.

Referring to FIG. 6, an instruction is divided into an IF stage, a D stage, an EXC stage, an MEM stage and a WB stage. Instruction fetch is performed in the latter half of IF stage and the former half of the D stage; decoding and operand fetch are performed in the latter half of the D stage; operation is executed in the EXC stage; memory access is performed in the MEM stage; and register writing is performed in the W stage. When the instruction is a branch instruction, branch executing process takes place in the former half of the EXC stage.

Figure 7:
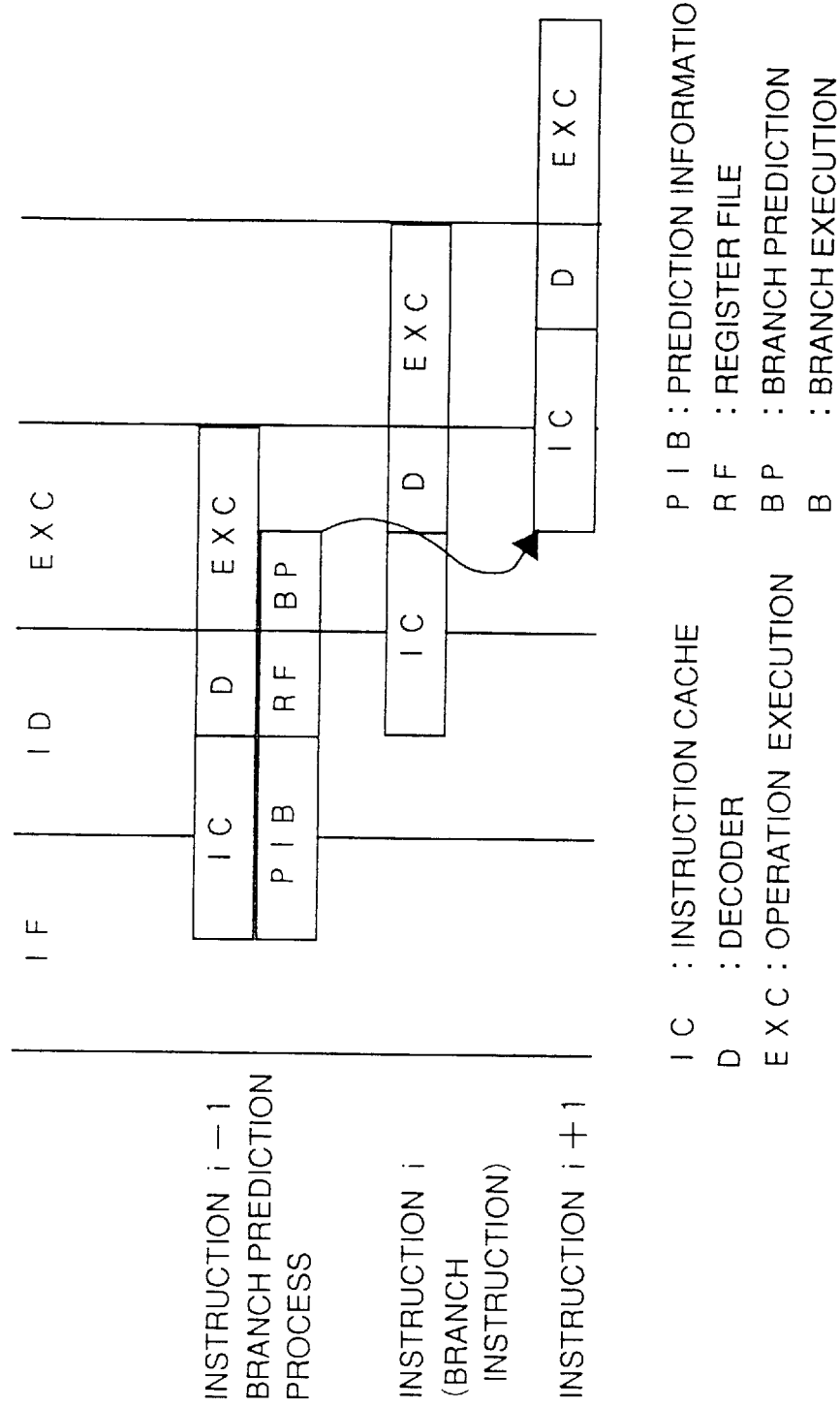
FIG. 7 schematically shows pipeline processing in accordance with the first embodiment.

In this pipeline method, respective instructions are executed shifted one stage by one stage as shown in FIG. 7, and execution of one instruction is completed in every cycle time necessary for 1 stage.

In this embodiment, referring to FIG. 7, while an instruction i−1 (latter half of IF stage to former half of ID stage), prediction information with respect to branch instruction i is read from prediction information buffer 56 (see FIG. 5) and applied to branch predicting mechanism 58 (see FIG. 5). The branch predicting mechanism provides read request to register file 52, and in the latter half of ID stage, condition code or data which is the base of the condition code, stored in the register file, is read. In the former half of EXC stage, prescribed branch predicting calculation is performed, and (taken)/(not-taken) is predicted. This corresponds to the portion "BP" in the former half of EXC stage of FIG. 7.

In case of a taken prediction, a branch target address generated parallel to the prediction is applied to the instruction cache as a fetch address of an instruction (instruction n+1) which is to be fetched in the cycle following the branch instruction. In case of a not-taken prediction, an address of a Fall-through instruction is used as the fetch address. The Fall-through instruction refers to an instruction executed when branch is not taken, and generally it refers to an instruction positioned statically following the branch instruction.

More specifically, branch predicting information of instruction i is read at the instruction i−1 preceding the branch instruction of instruction i, branch prediction is performed using this information, and then fetch address of instruction i+1 is generated. Therefore, there is much time margin for branch prediction.

Figure 16:
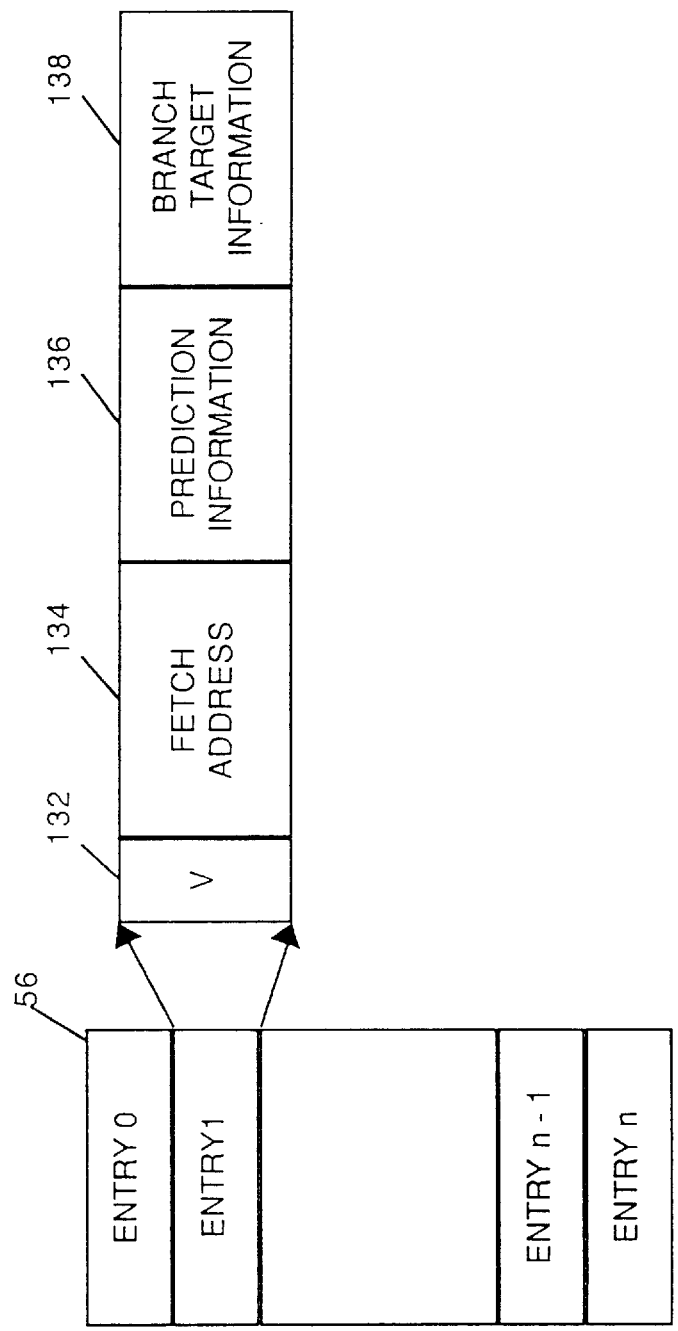
FIG. 16 schematically shows a structure of prediction information buffer 56 in accordance with the first embodiment.

The structure of prediction information buffer 56 is shown in FIG. 16. Prediction information buffer 56 is such a buffer as a BTB in the prior art. Referring to FIG. 16, prediction information buffer 56 includes a plurality of entries 0 to n−1. Each entry 130 consists of a valid flag 132, a retrieval address 134, prediction information 136 and branch target information 138. Prediction information buffer 56 is a kind of an associative memory and an address of an instruction fetched one cycle before the branch instruction (instruction i−1 of FIG. 7) is registered as retrieval address 134. Other address may be used as the retrieval address. Such example is shown in the ninth embodiment. The valid flag 132 indicates whether prediction information and branch target information stored in entry 130 is valid or not.

Prediction information 136 and branch target information 138 are registered in the prediction information buffer in the following manner. When a branch instruction is executed, prediction information generating mechanism 54 generates predicting information necessary for prediction by the branch predicting mechanism, based on an operation and/ operand of the branch instruction and, as needed, an operation and/or operand of a comparison instruction. The processing information is registered in the prediction information buffer as prediction information 136 of entry 130 of FIG. 16. At this time, branch target address is also registered, as branch target information 138.

When the prediction information buffer 56 is referred to, it is accessed by the fetch address simultaneously with the instruction cache. The retrieval address of each entry of the prediction information buffer is compared with the fetch address, and when there is a matching entry, the prediction information and the branch target address thereof are applied to branch predicting mechanism 58.

Now, a series of four operations, that is, (1) generation of a condition, (2) condition determination, (3) generation of branch target address and (4) setting of branch target, are necessary for a conditional branching. However, here, the branch target address generating process can be executed parallel to the operations (1) and (2). Therefore, the load of a conditional branching is larger than an ALU operation, for example. Further, in order to suppress branch delay and reducing penalty at the time of misfetch by reducing the time from fetching of the branch instruction until fetching of the branch target instruction, the conditional branch must be completed at an earlier stage than other instruction.

When a conditional branch is to be processed by one instruction in the instruction pipeline shown in FIG. 7, the operations (1), (2) and (4) must be carried out in the former half of EXC stage. As the generation of condition (1) requires comparison of magnitude, subtraction of 32 bits is necessary, for a 32 bit architecture. 32 bit subtraction operation is a processing performed by the ALU taking 1 cycle of time. When such processing is to be performed in half a cycle, a well balanced pipeline is not possible.

Therefore, in a common RISC (Reduced Instruction Set Computer) processor, the conditional branch processing is divided into a comparing instruction and branching instruction. The operation of (1) is performed by the comparing operation, and operations (2), (3) and (4) are performed by the branch instruction. For example, in a certain existing system, all conditional branches are processed divided into comparing instruction and branch instruction. Meanwhile, in another system, a branch instruction processing the operations (1), (2), (3) and (4) only when the condition can be readily generated is prepared, and hence the conditional branch processing is performed by using comparing instruction+branch instruction, or only by the branch instruction.

Figure 9:
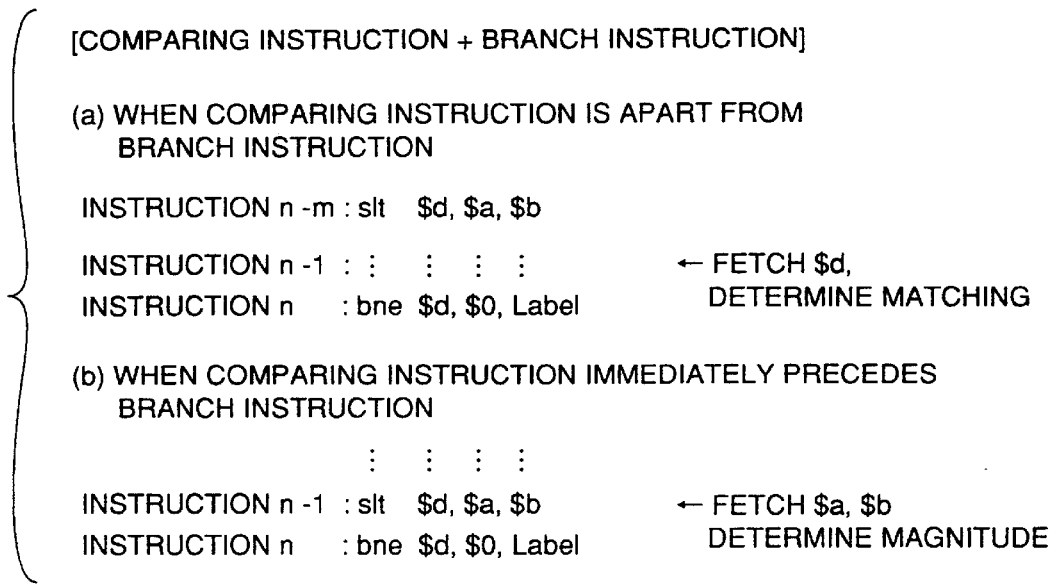
FIG. 9 schematically shows an example of instruction code in the first embodiment.

Branch predicting mechanism 58 shown in FIG. 9 can cope with the latter example, that is, the mechanism can process by using comparison instruction+branch instruction, or using branch instruction only. This embodiment is only an example, and therefore a system which processes always using the comparing instruction+branch instruction can readily be provided.

Figure 8:
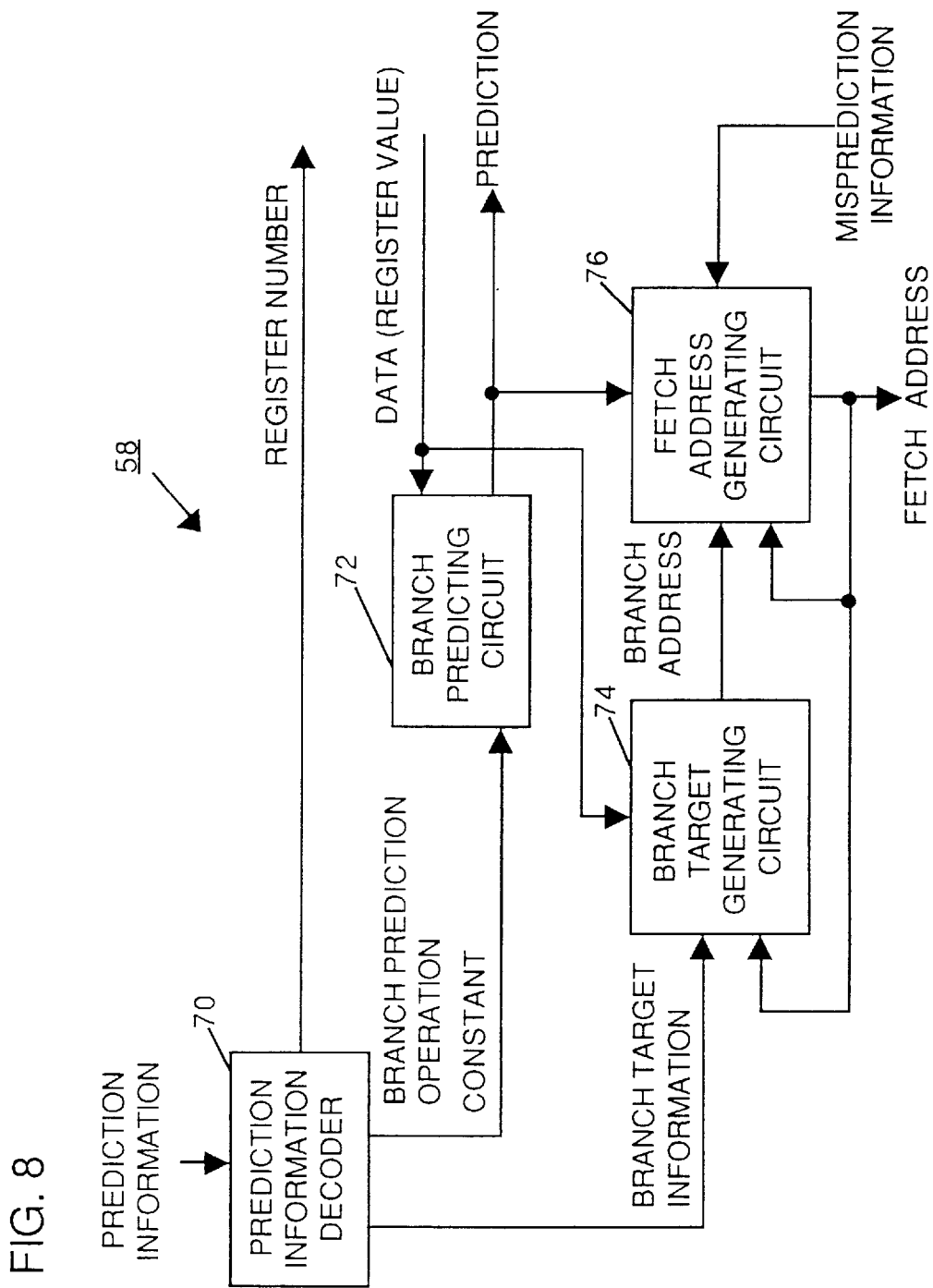
FIG. 8 is a block diagram of the branch predicting mechanism in accordance with the first embodiment.

Referring to FIG. 8, branch predicting mechanism 58 includes a prediction information decoder 70, a branch predicting circuit 72, a branch target generating circuit 74 and a fetch address generating circuit 76.

Prediction information decoder 70 receives the prediction information from prediction information buffer 56, applies a branch predicting operation and a constant to branch predicting circuit 72 and applies branch target information to branch target generating circuit 74, outputs a register number of the register to be accessed to register file 52, and hence makes an access request.

Details of branch predicting circuit 72 will be described later with reference to FIG. 13. This is for predicting direction of branching and outputting a branch prediction signal, in accordance with data (register 1) of the register having the number designated by prediction information decoder 70 as well as the branch prediction operation and the constant applied from prediction information decoder 70.

Branch target generating circuit 74 is for generating a branch target address at the time of a taken prediction, based on branch target information from prediction information decoder 70, the branch target address applied from the register, and the fetch address output from fetch address generating circuit 76.

Fetch address generating circuit 76 is for generating an address of an instruction predicted to be the next instruction to be fetched, based on the branch target address from branch target generating circuit 74, misprediction information from the pipeline 50 and immediately preceding fetch address, in response to the branch predicting signal from branch predicting circuit 72.

Let us consider a code for performing the following process, as an instruction related to the branch processing. In the following description, the reference character $a represents the value of a register designated by a, and Label indicates branch target address. For example, $0 indicates a value of a specific register holding the value 0, that is, the value 0.

The comparing instruction slt and four branch instructions beq, ble, bgez and bltz are defined, for example, as follows.

```
     comparing instruction: slt $a, $b, $c
● meaning if $b < $c then $a = 1
                            else $a = 0
● branch instruction: beq $a, $b, Label
     branch instruction if $a = $b then jump to Label
                                            (taken)
                                       else not jump
                                            (not-taken)
     : bne $a, Label
       if $a ≠ $b then jump to Label
                                            (taken)
                                       else not jump
                                            (not-taken)
     : bgez $a, Label
       if $a > 0 then jump to Label
                                            (taken)
                                       else not jump
                                            (not-taken)
     bltz $a, Label
       if $a < 0 then jump to Label
                                            (taken)
                                       else not jump
                                            (not-taken)
```

With this instruction code, the conditional branch and processing can be realized in the following manner.

```
● if $a < $b then jump
    → slt $d, $a, $b
        bne $d, $0, Label
● if $a > $b then jump
    → slt $d, $a, $b
        $d, $0, Label
● if $a = $b then jump
    → beq $a, $b, Label
● if $a ≠ $b then jump
    → bne $a, $b, Label
```

The branch predicting apparatus of the present embodiment performs branch prediction by carrying out the following branch predicting operation with respect to a register value fetched by the branch predicting circuit 72 (FIG. 8) in accordance with the instruction code of branch processing.

(1) When the instruction code of the branch processing consists of a comparing instruction+a branch instruction (FIG. 9)

(i) When there is one or more cycles between the comparing instruction and the branch instruction (FIG. 9(a))

Figure 14:
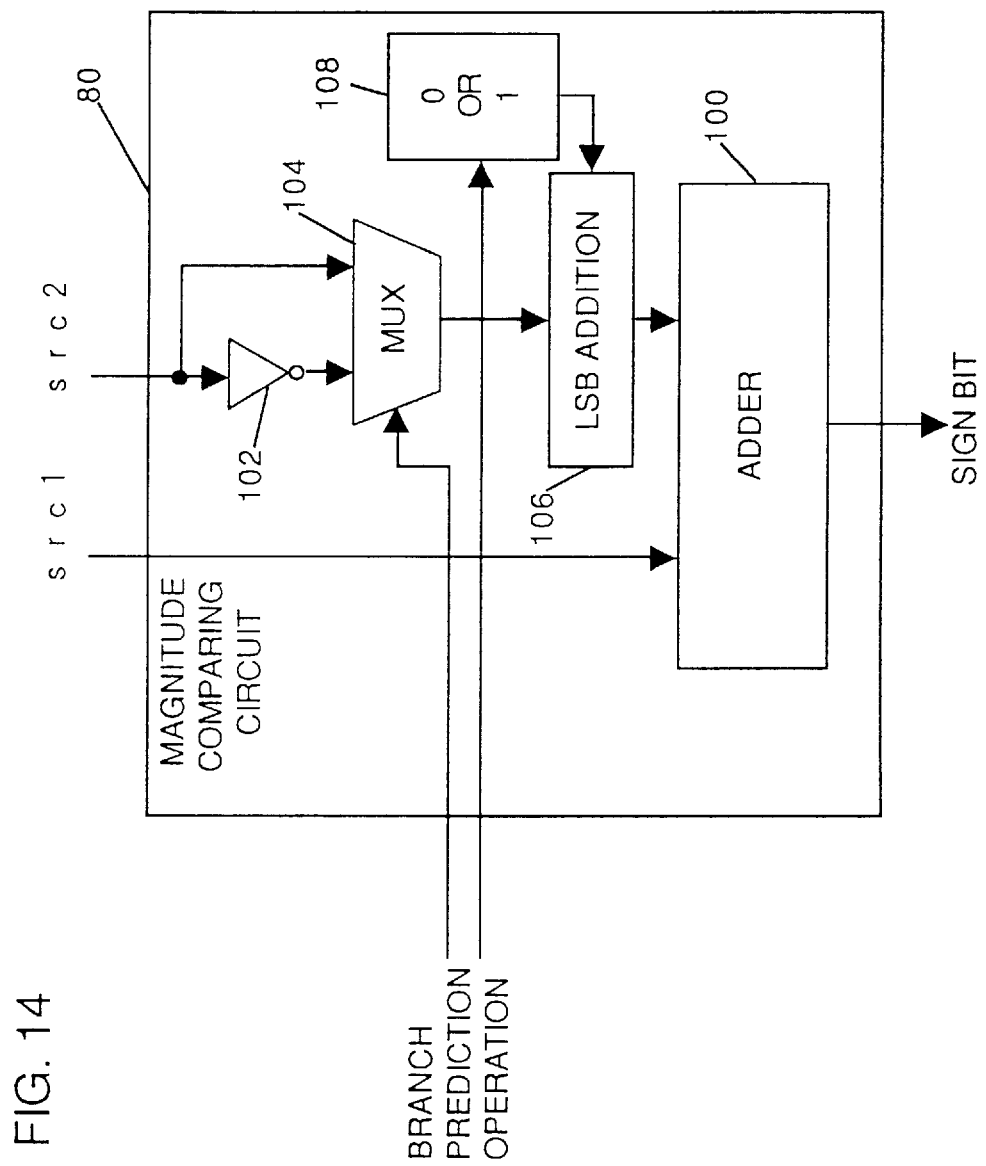
FIG. 14 is a block diagram of a magnitude comparing circuit in accordance with the first embodiment.

Referring to FIG. 14, when there is one or more cycles between the comparing instruction (instruction n−m) and a branch instruction (instruction n), the branch predicting mechanism can refer to the result of execution of the comparing instruction slt. Therefore, condition $d generated by the comparing instruction slt can be directly used for branch prediction. When data used for prediction fetch is represented as src1, src2, . . . , then the prediction fetch data would be src1=$d, src2=$0, and branch predicting operation is to "output an inversion of a result of comparison for matching." If branch instruction is not bne but beq, then the branch prediction operation would be to "output result of comparison for matching."

(ii) When the comparing instruction immediately precedes the branch instruction (FIG. 9(b))

As shown in FIG. 9(b), when the comparing instruction slt (instruction n−1) immediately precedes branch instruction bne (instruction n), a source operand ($a, $b) of comparing instruction slt is used for branch prediction. More specifically, prediction fetch data src1=$a, and src2=$b. At this time, the branch predicting operation is to "output the result of magnitude comparison." However, this is when the branch instruction is bne. If the branch instruction is beq, then the branch predicting operation would be to "output an inversion of the result of magnitude comparison."

Figure 10:
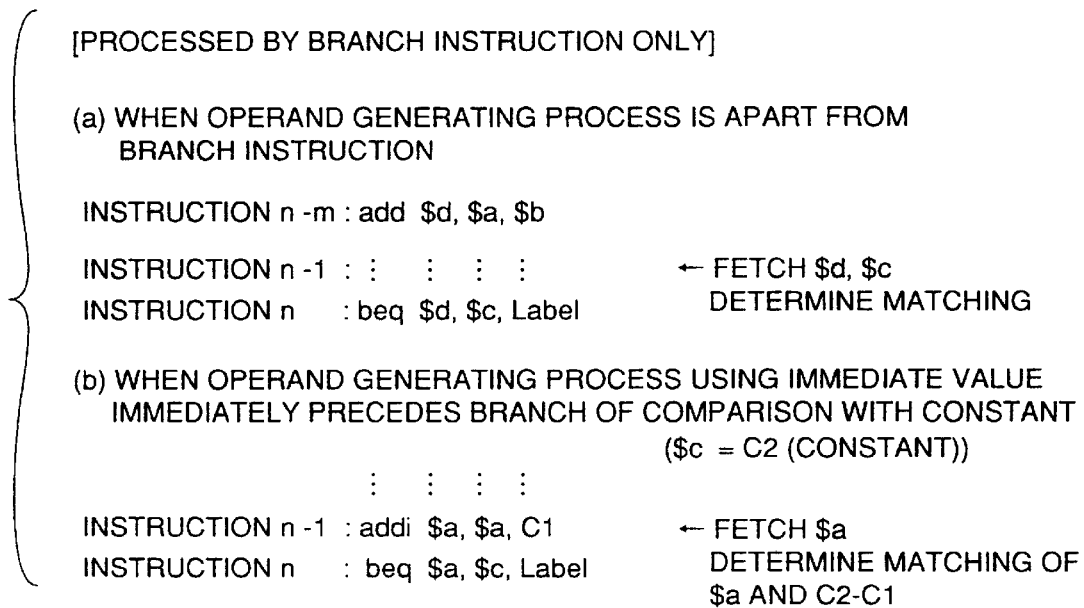
FIG. 10 schematically shows instruction codes in accordance with the first embodiment.

(2) When processing is done only by the branch instruction (FIG. 10)

(i) When there is one or more cycles between the branch instruction and an instruction for generating the operand thereof (FIG. 10(a))

Referring to FIG. 10(a), the operand ($d, $c) to which branch instruction beq (instruction n) refers can be used for branch prediction as well. Therefore, prediction fetch data src1=$d and src2=$c, and the branch prediction operation is to "output the result of comparison for matching." This is when the branch instruction is beq, and if the branch instruction is bne, then the branch prediction operation is to "output an inversion of the result of comparison for matching."

(ii) When an instruction generating a branch operand requires calculation using an immediate value and directly preceding the branch prediction and a reference used in the branch instruction is a constant (FIG. 10(b)).

Referring to FIG. 10(b), the value obtained by subtracting the immediate value C1 from the operand $a at instruction n−1 is stored in the register which is designated by a. At instruction n, whether $a matches the reference value $c (constant C) is determined. In this case, the content of $a is rewritten by the processing of instruction n−1, and therefore even when $a is fetched at the stage of instruction n−1 and branch prediction is performed, accurate prediction is not possible. Therefore, the following operation is carried out.

A value (C2−C1) obtained by subtracting the immediate value C1 of instruction n−1 from reference value $c (constant C2) of the branching is registered as predicting constant of branch prediction information, in the branch prediction information. For branch prediction, the branching constant is compared with a source operand ($a) of the branch instruction. Therefore, the prediction fetch data src1 would be $a and src2 would be the predicting constant (C2−C1), and the branch predicting operation would be to "output the result of comparison for matching." The branch predicting operation is when the branch instruction is "beq", and when branch instruction is "ble", then the branch prediction operation is to "output inversion of the result of comparison for matching."

When the instruction is a nonconditional branching, prediction fetch data would be src1=$0 and src2=$0, and the branch predicting operation is to "output the result of comparison for matching." Thus the prediction would be taken branch without fail, and the instruction branches unconditionally.

Let us consider the next example. It is already described that two branch instructions, that is bgez and bltz are prepared as branch instructions requiring magnitude comparison with 0. Problems related to these instructions will be described with reference to FIG. 11.

Referring to FIG. 11, when a branch instruction requiring magnitude comparison between its operand and 0, for example instruction bgez (instruction n) does not have a corresponding comparing instruction, there is an instruction generating an operand of branch of the branch instruction immediately before this branch instruction, and an instruction for generating the operand requires calculation using a register value, then it is impossible to obtain $a at a timing of fetching instruction n−1 for performing branch prediction.

In this case, branch prediction can be started at the time of fetching of the instruction n−1 in the following manner. More specifically, in the example shown in FIG. 11, $a=$b+$c is calculated in instruction n−1, and magnitude of $a and 0 is compared in instruction n. Therefore, it is possible to predict branching of a branch instruction at instruction n by obtained $b and $c at the same timing as the fetching of instruction n−1, not waiting for the generation of $a, calculating $b+$c and compare the magnitude with the result of calculation and 0. The structure of this embodiment also permits such branch prediction.

As another problem, referring to FIG. 12, when a conditional branch instruction beg (instruction n) does not have a corresponding comparing instruction, an instruction generating an operand of branching exists immediately before the branch instruction (instruction n−1) and the instruction utilizes a register value, then branch prediction of the branch instruction is not possible, as in the case of FIG. 11. This problem can be solved in the following manner.

Referring to FIG. 12, the sum of $b and $c is calculated in instruction n−1, which sum is referred to as $a, and in instruction n, whether $a matches $b or not is determined. Therefore, when $b and $c are obtained at the time of fetching instruction n−1 and the sum is compared with $d, it is possible to perform branch prediction of instruction n, without waiting for calculation of $a by instruction n−1. The structure of the apparatus in accordance with the present invention also permits such prediction.

Figure 13:
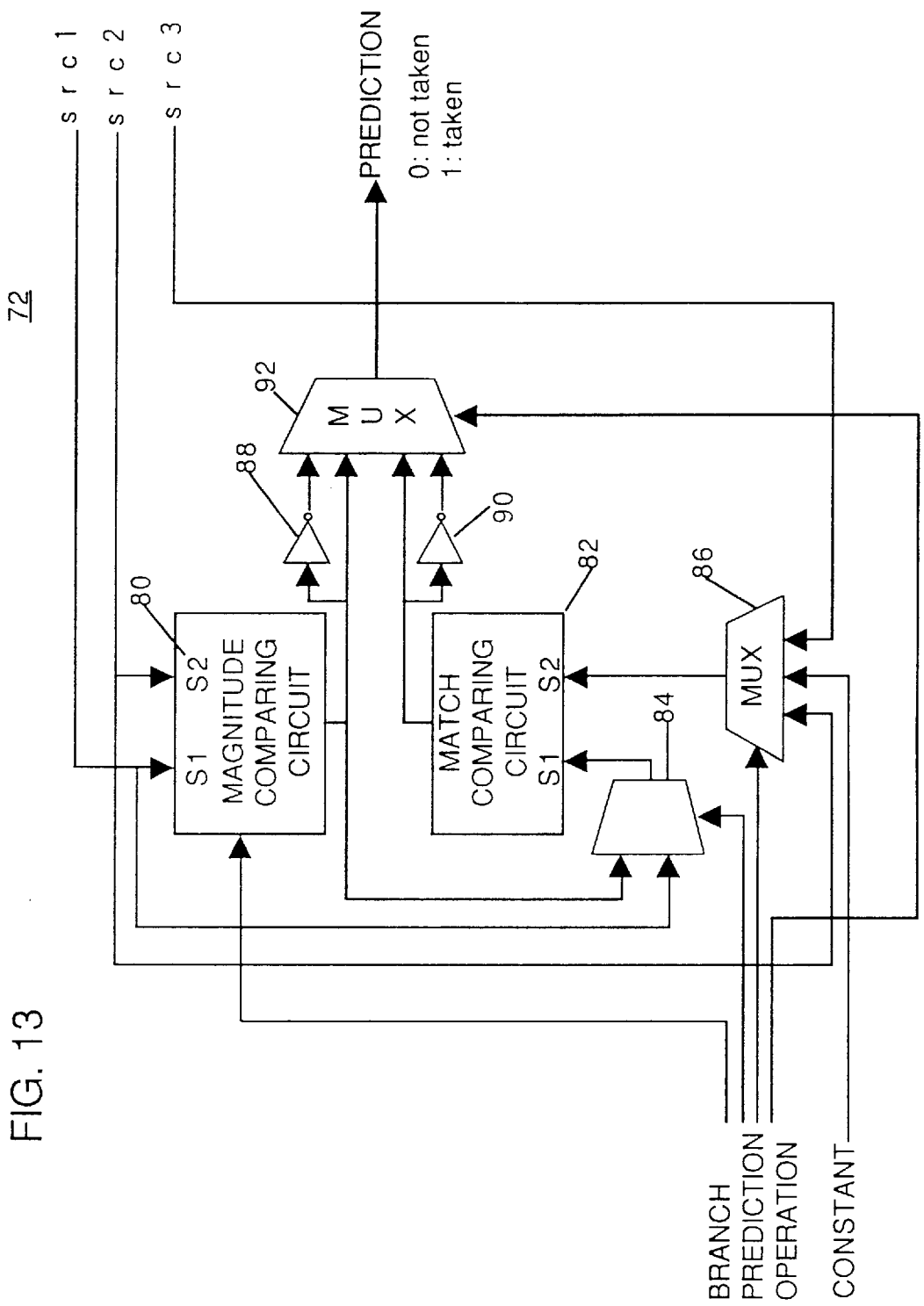
FIG. 13 is a block diagram of a branch predicting circuit in accordance with the first embodiment.

FIG. 13 is a block diagram of a branch predicting circuit 7 so structured as to solve the problems described above. Referring to FIG. 13, branch predicting circuit 72 includes a magnitude comparing circuit 80, a match comparing circuit 82, multiplexers 84, 86 and 92, and inverting circuit 88 and 90.

Source operands src1 and src2 are applied to two inputs s1 and s2 of magnitude comparing circuit 80, respectively.

Source operand src1 and an output from magnitude comparing circuit 80 are applied to two inputs of multiplexer 84. Multiplexer 84 selects and outputs one of the inputs in accordance with a branch prediction operand applied from prediction information decoder 70 shown in FIG. 8.

Multiplexer 86 has three inputs. Source operand SRC 2 is applied to one input. Constant data is applied from prediction information decoder 70 shown in FIG. 8 to another input. Source operand SRC 3 is applied to the remaining input. Multiplexer 86 selects and outputs one of the three inputs, in response to a branch prediction operation from prediction information decoder 70.

Match comparing circuit 82 includes two inputs S1 and S2. Input S1 is connected to an output of multiplexer 84. Input S2 is connected to an output of multiplexer 86. Match comparing circuit 82 is for outputting a signal indicating whether or not the input S1 and S2 match each other.

Input to inverting circuits 88 and 90 are connected to output of magnitude comparing circuit 80 and match comparing circuit 82, respectively.

Multiplexer 92 has four inputs, which inputs are connected to an output of inverting circuit 88, an output of magnitude comparing circuit 80, an output of match comparing circuit 82 and an output of inverting circuit 90, respectively. Multiplexer 92 selects and outputs one of the four inputs, in response to the branch predicting operation. This output is the prediction signal, which indicates not-taken when it is 0, and taken when it is 1.

Basically, magnitude comparing circuit 80 is for comparing magnitude of two inputs S1 and S2 for outputting a sign bit thereof. However, dependent on the branch prediction operation, it may operate to add the values of two inputs S1 and S2 and to provide the result. The details will be described later. Such addition is possible since magnitude comparing circuit 80 inherently includes a subtracting circuit. As an output of magnitude comparing circuit 80, data of an absolute value of the result of addition or subtraction is included other than the sign bit, and these are applied together with the sign bit, to multiplexer 84.

Referring to FIG. 14, magnitude comparing circuit 80 includes an adder 100, an inverting circuit 102, a multiplexer 104, a constant generating circuit 108 for generating constant data of 0 or 1, and an LSB adder 106 for adding an output from constant generating circuit 108 to the LSB (Least Significant Bit) of the output from multiplexer 104.

Essentially, magnitude comparing circuit 80 calculates src1−src2, by adding the least significant bit of 2's complement of src2 plus 1 to src1. If this operation of "inverting the operand and add 1 to the least significant bit" is not performed, addition of src1 and src2 becomes possible. By providing such function, magnitude comparing circuit 80 allows not only for magnitude comparison between two inputs src1 and src2 but also addition of these inputs.

To the input of inverting circuit 102, src2 is applied. An output from inverting circuit 102 is applied to one input of multiplexer 104, and src2 is directly applied to the other input. Multiplexer 104 selects and outputs either of the two inputs, in response to the branch prediction operation.

Constant generating circuit 108 operates in response to the branch prediction operation, and outputs 1 when magnitude comparison is to be performed, and outputs 0 when addition is to be performed.

LSB adder 106 is for adding an output from constant generating circuit 108 to the least significant bit of the value output from multiplexer 104.

To one input of adder 100, src1 is applied, and to the other input, an output from LSB adder 106 is applied. Adder 100 adds these two inputs, and outputs at least a sign bit. As already mentioned, not only the sign bit but other results of operations can be obtained from adder 100. By examining the sign bit, it can be determined whether src1−src2≧0 or src1+src2≧0.

By using branch predicting circuit 72 shown in FIGS. 13 and 14, branch prediction can be performed for each of the examples shown in FIGS. 9 to 12 in the following manner.

Let us consider the case of FIG. 9(*a*). $d is input as src1, and $0 is input as src2. Multiplexer 84 selects src1 and applies the same to input S1 of the match comparing circuit. Multiplexer 86 selects src2, and applies the same to input S2 of match comparing circuit 82. Match comparing circuit 82 applies the result of comparison between two inputs to multiplexer 92 and inverting circuit 90. Multiplexer 92 selects an output from inverting circuit 92, in accordance with the branch prediction operation. Therefore, branch prediction of the example (1) (i) mentioned above is performed. In this case, magnitude comparing circuit 80 is not used.

In the example of FIG. 9(*b*), the following operation is performed. $a is applied as src1, and $b is applied as src2. Referring to FIG. 14, constant generating circuit 108 applies 1 to LSB adder 106. Multiplexer 104 selects an output from inverting circuit 102, and applies the same to LSB adder 106. LSB adder 106 adds 1 to the least significant bit of the output from multiplexer 104, and applies the result to adder 100. Adder 100 adds src1 to the output from LSB adder 106, and applies sign bit thereof to the inputs of multiplexer 92 and of inverting circuit 88 shown in FIG. 13. Multiplexer 92 selects the output from magnitude comparing circuit 80 in accordance with the branch prediction operation, and outputs this as a prediction signal. This enables the operation of (1) (ii) above. When branch comparing instruction is beq, multiplexer 92 should be adapted to select the output from inverting circuit 88.

For the example of FIG. 10(*a*), the following operation is performed. As the prediction fetch data, $d is applied as src1, and $c is applies as src2, respectively. Multiplexer 84 selects src1, and multiplexer 86 selects src2. The output from match comparing circuit 82 is selected by multiplexer 92, and it is used as the prediction signal. This enables the branch prediction of FIG. 10(*a*). If the branch instruction is bne, then the output from inverting circuit 90 may be selected. This enables the processing of (2) (i) above.

The example of FIG. 10(*b*) is addressed in the following manner. As prediction fetch data, src1 selects $a, and src2 selects prediction constant (C2−C1). However, in this case, it is assumed that src2 is applied as constant data from prediction information buffer 56 (see FIG. 5). Referring to FIG. 13, multiplexer 84 selects src1. Multiplexer 86 selects constant data. Multiplexer 92 selects an output from match comparing circuit 82. If the branch instruction is bne, multiplexer 92 is adapted to select the output from inverting circuit 90. This enables the operation of (2) (ii) above.

In case of a conditional branching, $0 is applied as src1 and src2 shown in FIG. 13, and multiplexer 84 selects src1 while multiplexer 86 selects src2. Multiplexer 92 selects an output from match comparing circuit 82. Since two inputs of match comparing circuit 82 always match each other, the prediction signal is always a taken branch.

The following operation is performed for the example shown in FIG. 11. $b is applies as src1, and $c is applies as src2. Referring to FIG. 14, multiplexer 104 of magnitude comparing circuit 80 selects src2, and applies the same to LSB adder 106. Constant generating circuit 108 generates 0 and applies this to LSB adder 106. LSB adder 106 adds the constant 0 to the least significant bit of the output from multiplexer 104, and applies the result to adder 100. In other words, the output from LSB adder 106 is src2 itself. Adder 100 adds src1 and src2, and outputs a sign bit and the absolute value. By examining the sign bit output from adder 100, it is possible to determine whether src1+src2≧0. Therefore, even in the case of FIG. 11, branch prediction of branch instruction n is possible without the necessity to wait for the completion of instruction n−1. More specifically, even when an instruction for generating an operand of branching immediately before the branch instruction and requires calculation using a register value, prediction is possible provided that the branch instruction is comparison of magnitude with 0.

The following operation is performed for the example shown in FIG. 12. In the example of FIG. 12, determination of $b+$c=$d is necessary. In this case, referring to FIG. 14, multiplexer 104 selects src2 and constant generating circuit 108 is adapted to generate 0. Then, adder 100 outputs the result of addition of src1 and src2. In other words, when $b is applied as src1 and $c is applied as src2, $b+$c can be obtained at the output of adder 100.

Referring to FIG. 13, multiplexer 84 selects the output ($b+$c) from magnitude comparing circuit 80. $d is applied as src3, and multiplexer 86 is adapted to select src3. This enables calculation of $b+$c=$d in match comparing circuit 82. When the output from match comparing circuit 82 is selected by multiplexer 92, branch prediction of branch instruction beq is possible, and when output from inverting circuit 90 is selected by multiplexer 92, branch prediction of branch instruction bne is possible.

Therefore, even when an instruction for generating an operand of branching immediately precedes the branch instruction and requires calculation using a register value, prediction is possible for any type of branch instruction. In other words, branch prediction is possible for any branch instruction in which whether branch is taken or not is determined based on matching with a constant or a variable or based on the result of magnitude comparison between a constant or a variable.

It should be noted that the structure of FIG. 14 is proposed for enabling various functions, and it will be readily understood by those skilled in the art that portions not necessary for implementing only some part of the functions may be omitted.

Here, as branch target information 138 of prediction information buffer 56 shown in FIGS. 5 and 16, branch target address itself may be stored. However, in a processor having 32 bit architecture, for example, the number of bits of the branch target address is as large as about 30 bits. In order to improve prediction hit rate, the number of entries of prediction information buffer 56 may be increased. However, if the branch target addresses to be held in prediction information buffer have large number of bits, the area of the buffer would be considerably large. Therefore, the increase in the area of the buffer is suppressed in the following manner.

Figure 15:
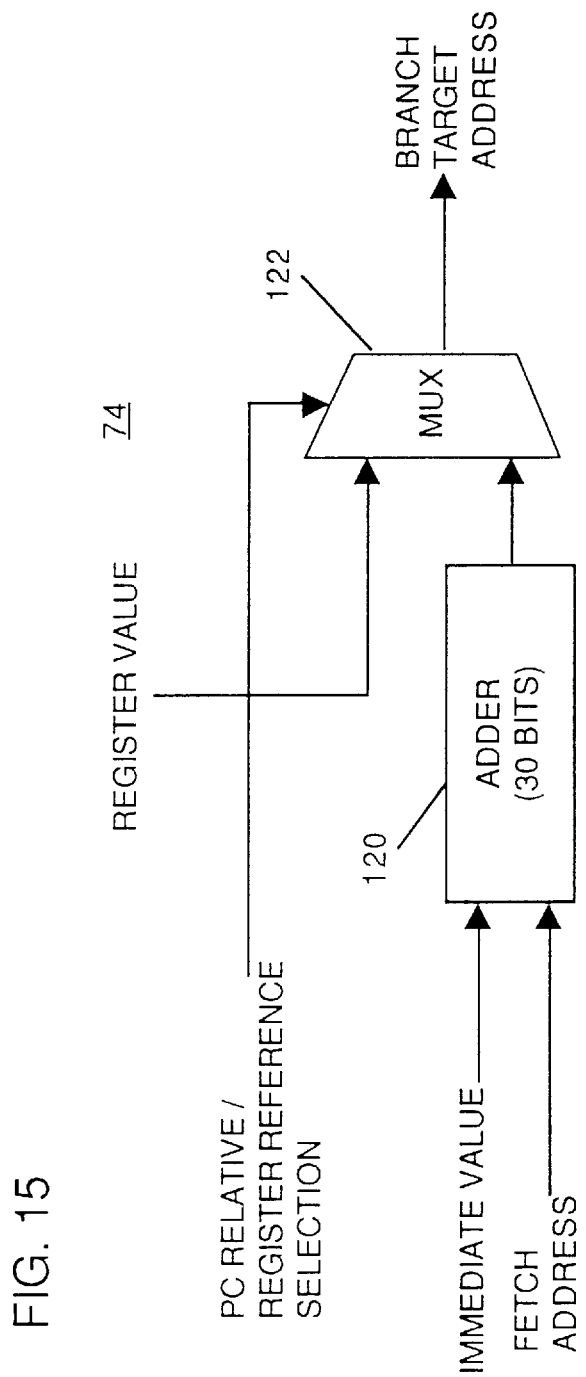
FIG. 15 is a block diagram showing a branch target generating circuit in accordance with the first embodiment.

Referring to FIG. 15, as branch target information, information for selecting whether the branch target is designated by a PC (Program Counter) relative or by a register value, and an immediate value which is the value to be added in the case of PC relative or the register number are held. Branch target generating circuit 70 includes a 30 bit adder 120 for adding a fetch address and the immediate value included in the branch target information; and a multiplexer 122 having an input to which the register value read from the register value stored in the branch target information and an input to which the output from adder 120 is applied, for selecting one of the two inputs in response to the PC relative/register value selecting information and outputting the result as branch target address.

When the selecting information designates a PC relative, multiplexer 122 selects an output from adder 120. Meanwhile, when selecting information selects a register value, multiplexer 122 selects the register value. The register value is the value read from the register designated by the register number stored in branch target information 138 shown in FIG. 16.

In the branch prediction using BTB, reading of BTB and the setting of prediction branch target must be performed within one cycle, and therefore there is not time to generate the branch target by addition. Therefore, in the BTB method, the branch target address has to be held as it is in the BTB. However, in the branch prediction method of the present invention, there is time of 1 cycle from acquisition of prediction information to the setting of branch branch target, and therefore addition of about 30 bits can be performed with sufficient time. Further, since register fetch is possible, the branch target address can be generated referring to the register, even when the branch instruction includes register designation.

Only ten and several bits are required as the immediate value, no matter whether it is an offset of PC relative or a register number. The branch target information 138 (FIG. 16) can be reduced from 130 bits required when the branch target address itself is to be held, to ten and several bits containing the immediate value and the operation. Therefore, each entry of the buffer can be reduced. As a result, the hardware amount of prediction information buffer 56 (see FIG. 5) can be reduced. Alternatively, even when the number of entries is increased to improve prediction hit rate, the amount of increase in the hardware can be suppressed.

As described above, in the branch predicting method of the present invention, not the history information of the past but condition to be referred to by the branch instruction to be executed, or the data on which the condition is generated, is used for prediction. Since prediction is performed based on the data actually used in determining the direction of branching, the present method allows effective prediction even of a branch instruction not related with the result of past execution but has its direction of branching changed at random.

For distinguishing the method of the present invention from the conventional method based on the history, the method of the present invention will be referred to as data reference branch predicting scheme.

The data reference branch predicting scheme has at least two advantages. As just mentioned, prediction is carried out based on the data which is actually used by the branch instruction. Therefore, effective prediction is possible even for a branch instruction which is not correlated with the result of past execution. Another advantage is that not all but only a part of data which is referred to by the branch instruction may be compared for determining condition in predicting direction of branching, since it is after all prediction of branching. More specifically, it is not necessary for the magnitude comparing circuit 80 or match comparing circuit 82 shown in FIG. 13 to compare all the data. For example, the comparing circuit may compare only an appropriate number of bits which can be compared without extending the cycle time, for example. The sign bit and lower 7 bits only may be compared. This reduces time for comparison, and in addition, the register file used only for supplying data for branch prediction have only to include 8 bits, and thus the area can be reduced.

According to McFarling, only about 8% of the total number of comparisons require complete comparison. By contrast, as high as 56% of all the comparisons require the comparison with 0 only. For the comparison with 0, only the comparison utilizing the sign bit and the lower 7 bits is sufficient. There may be not much branches which require comparison of a large number of bits for accurate prediction. Therefore, it is expected that highly effective prediction is possible when only a part of data is compared.

In this manner, when comparison is performed using only the sign bit and a plurality of lower bits, considerably effective prediction is possible without extending the cycle time. However, this method suffers from a disadvantage that higher bits are not reflected at all to the result of prediction. More effective prediction may be possible if the higher bits can be reflected in some way or other. However, in that case also, it is necessary not to extend the cycle time.

Therefore, in the apparatus of the present invention, the value which is referred to by the branch predicting mechanism and used for comparison is compressed in the following manner.

As an example, let us consider comparison of 256 and 16 in decimal notation, by a computer. These values are represented as "100000000" and "000010000" in binary notation, respectively. When only the sign bit and lower 7 bits are compared as mentioned above, then 256 would be "00000000" and 16 would be "00010000", and therefore the result of comparison is 265<16, where sign bit 0 indicates a positive number. As a result, the comparison is not correct, and correct result cannot be obtained.

Figure 17:
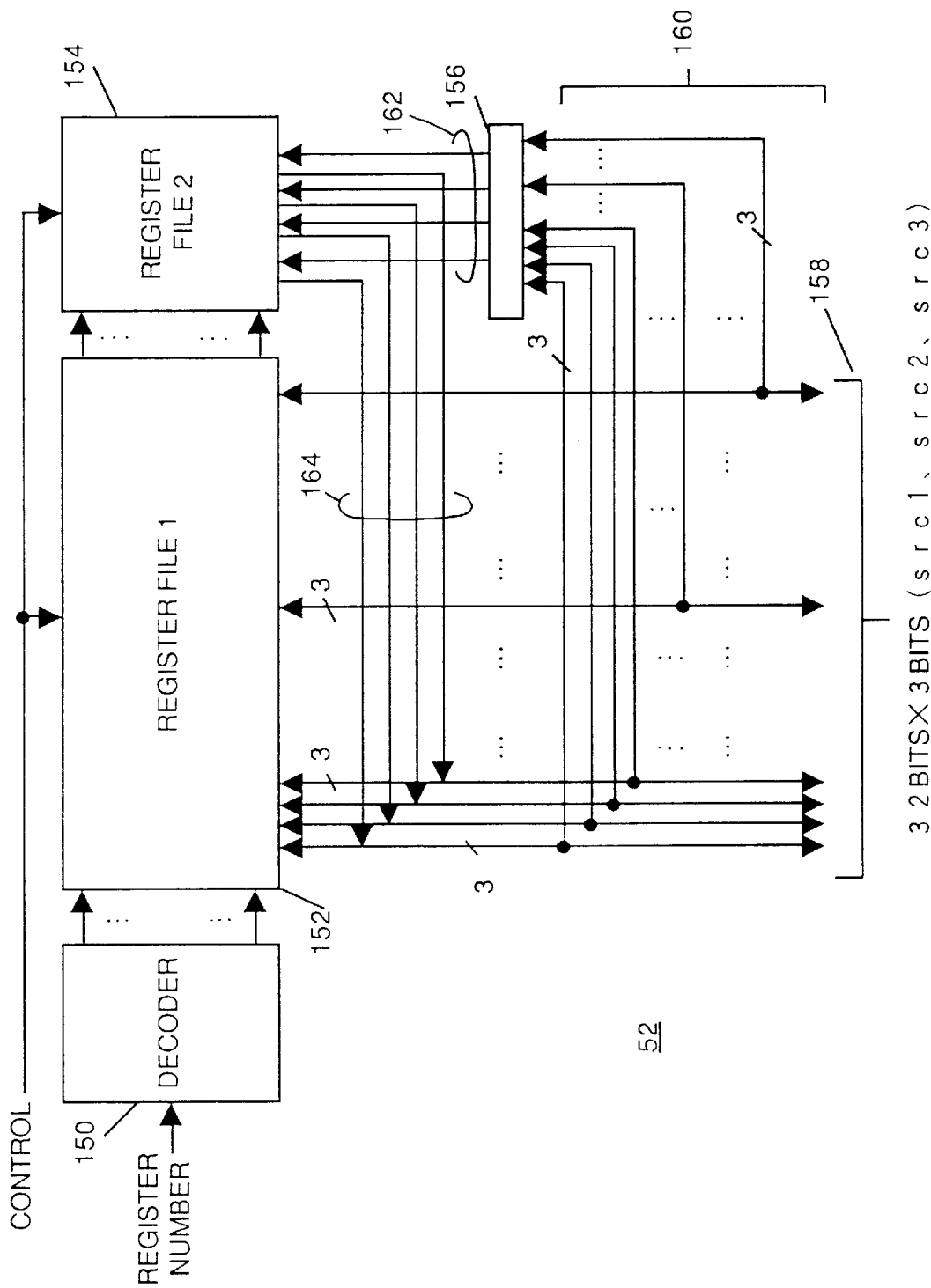
FIG. 17 is a block diagram of a register file in accordance with the first embodiment.

Therefore, in the present embodiment, a compressing portion 156 for compressing data to be written to register file 52 is provided as shown in FIG. 17. In addition, in register 52, a first register file 152 which is the inherent register file, and a second register 154 which is used only for storing the compressed data are provided, and data compressed by compressing portion 156 is stored in register file 154.

Referring to FIG. 17, a decoder 150 is connected to register files 152 and 154, and a control signal is applied thereto. When a register number is applied, decoder 150 connects corresponding register rows of register files 152 and 154 to a data line 158. Data line 158 includes 32 data lines for src1, 32 data lines for src2, and 32 data lines for src3. These data lines are branched to be a compressing portion input 160, which serves as the input to compressing portion 156. There is a compressing portion output 162 of compressing portion 156, which output is connected to an input of register file 154. The output from register file 154 is connected through output data line 164 to some of the data lines included in data line 158.

The register file shown in FIG. 17 operates in the following manner. Writing to register file 152 is carried out in the following manner. First, a register number is applied to decoder 150. Information as to which of the data lines src1, src2 and src3 is connected to each of the register cells in register file, and which of input/output of data is selected, is applied to register file 152. Each register of the register cell row selected by decoder 150 of register file 152 is connected to the corresponding data line, enabling input/output of data.

Writing of data to register file 154 is performed in the following manner. To the data line for src1, src2 or src3 of data line 158, data for writing is output. Compressing portion 156 compresses the data, and applies the compressed data to register file 154. Each register cell of the register cell row of register file 154 selected by decoder 150 is connected to the data line of src1, src2 or src3 in accordance with a control signal, and stores data.

By contrast, in data reading, a register row of register file 154 is selected by decoder 150, and data is output through data line 164 to data line 158. In this case, the data stored in register file 154 has been compressed, and therefore what is output to data line 158 is the compressed data.

If the data for prediction information is not compressed but only a part of the data is stored in register file 154, compressing portion 156 is not necessary. In that case, the sign bit and lower 7 bits of the data are fed to register file 154, and the output of register file 154 may feed the sign bit and lower 7 bits of data line 158 to the data line. The bits used are not limited to the sign bit and lower 7 bits, and other bits may be used.

In this embodiment, data is compressed before it is stored in register file 154. This is to reduce load on the branch predicting mechanism and to reduce capacity of register file necessary for branch prediction. Data before compression may be written in the register file and the data may be compressed after reading. In that case, it is not necessary to provide a register file 154 for that purpose only, and the data may be written in register file 152. However, in that case, load on the branch predicting mechanism is heavy.

Figure 18:
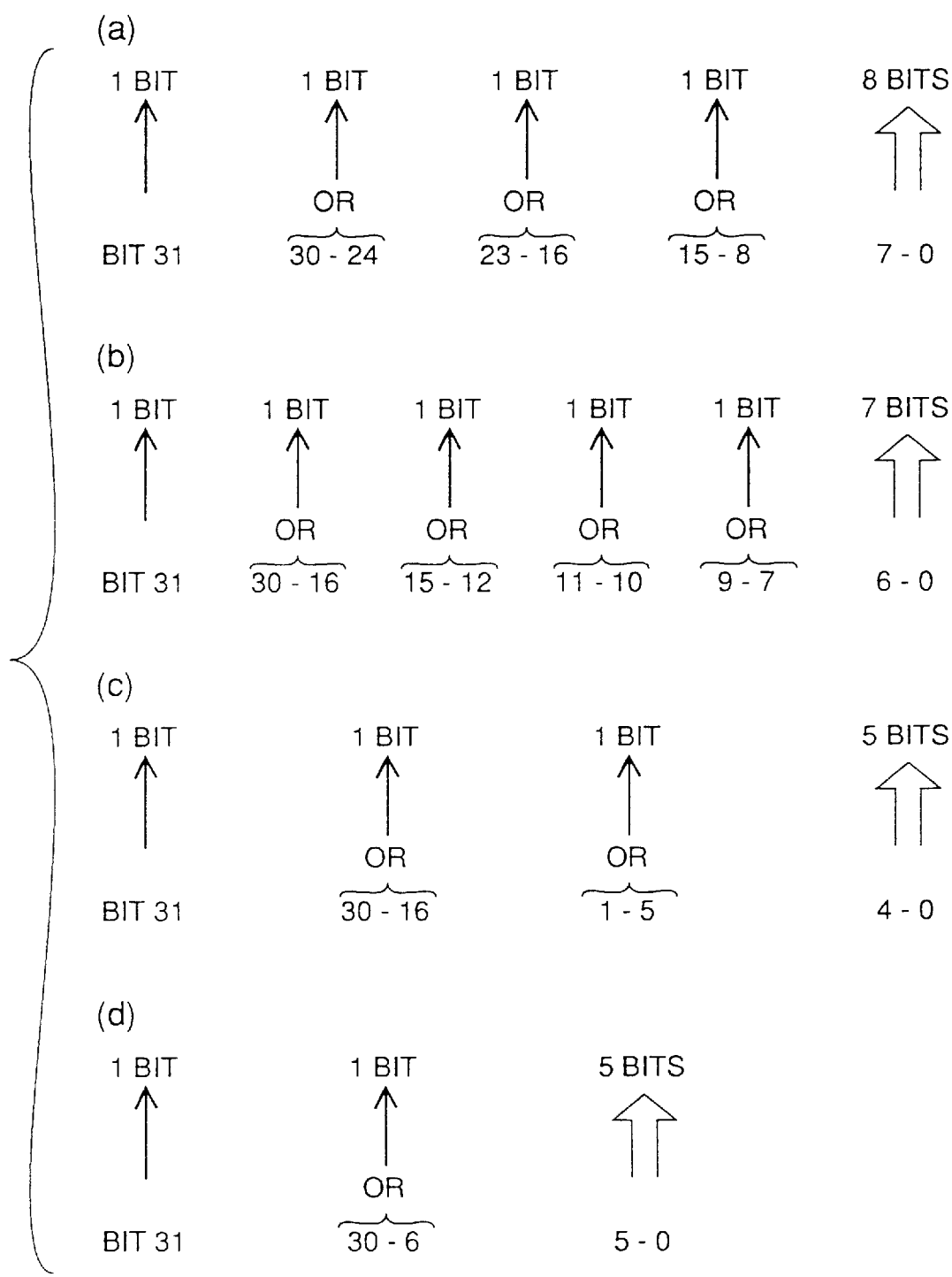
FIG. 18 shows the manner of compression of data stored in the register file in accordance with the first embodiment.

A method such as shown in FIG. 18 may be used as the method of compression. In the example shown in FIG. 8(a), the most significant bit (bit 31) is used as it is, as for bits 30 to 8, an OR is obtained at every 8 bits, and resulting 1 bit is used. The lower bits 7 to 0 are used as they are. Therefore, the data can be compressed to 1 bit of the sign bit+3 bits after compression+lower 8 bits, that is, a total of 12 bits. When we compare 256 and 16, for example, the compressed data would be 256="000100000000" and 16="000000010000", and correct result of 256>16 can be obtained.

Various other methods for collecting the number of bits are possible. Examples are shown in (b) to (d) of FIG. 18. In any case, the sign bit (bit 31) and plural lower bits are used as they are, and intermediate bits are subjected to OR operation in the unit of several bits, so that they are reflected on the result of comparison.

In this manner, the number of bits to be compared are not much increased while values of higher bits can be reflected on the result of comparison to some extent. Therefore, hit rate of branch prediction can be improved.

In such data reference predicting scheme, information designating a hardware such as a register number is supplied to the branch predicting mechanism, and branch predicting mechanism reads the result of execution based on the information and performs branch prediction. Here, the hardware designating information necessary for prediction may be supplied by means of an instruction. However, in that case, the position of the instruction supplying such information must be fixed with respect to the branch instruction. In other words, it imposes constriction to scheduling. Alternatively, it may be necessary to provide a new field in the instruction.

Therefore, in the present invention, the information used for branch prediction is held in a hardware such as a register file, and an information (such as a register number) designating the hardware holding the data to be referred to is held by a buffer. This is referred to as indirect method. This enables supply of information designating the hardware to the branch predicting mechanism, without fixing the position of the instruction or without providing additional field in the instruction.

Such problem also occurs in branch prediction based on history. More specifically, when the instruction is a register relative branch instruction in which branch target is set by a register value, branch target changes. Therefore, even when the prediction of the direction of branching matches, the branch prediction may result in a miss hit. Even in that case, correct branch target address can be obtained regardless of the change in the designation address, when the designation address is stored in a certain hardware and information designating the hardware is supplied to the branch predicting mechanism. More specifically, the concept of supplying information designating a hardware to the branch predicting mechanism is applicable not only to the data reference predicting scheme but applicable, in combination, to branch prediction based on history.

[Second Embodiment]

In the data reference branch predicting scheme shown in the first embodiment, the data actually used by the branch instruction is obtained at the same timing as an instruction fetched before the branch instruction, and branch prediction is performed based on the obtained data. Therefore, effective prediction is possible even for a branch instruction which is not correlated with the history of past execution. However, there may possibly be a conditional branch instruction for which data necessary for prediction is not available by the time prediction is performed. In that case, effective prediction is not possible by the data reference branch predicting scheme.

Therefore, in the second embodiment, not the data reference prediction information but history information is held for such an instruction, and a hardware enabling prediction based on history is prepared in the branch predicting mechanism, so that prediction based on history is also possible.

Figure 19:
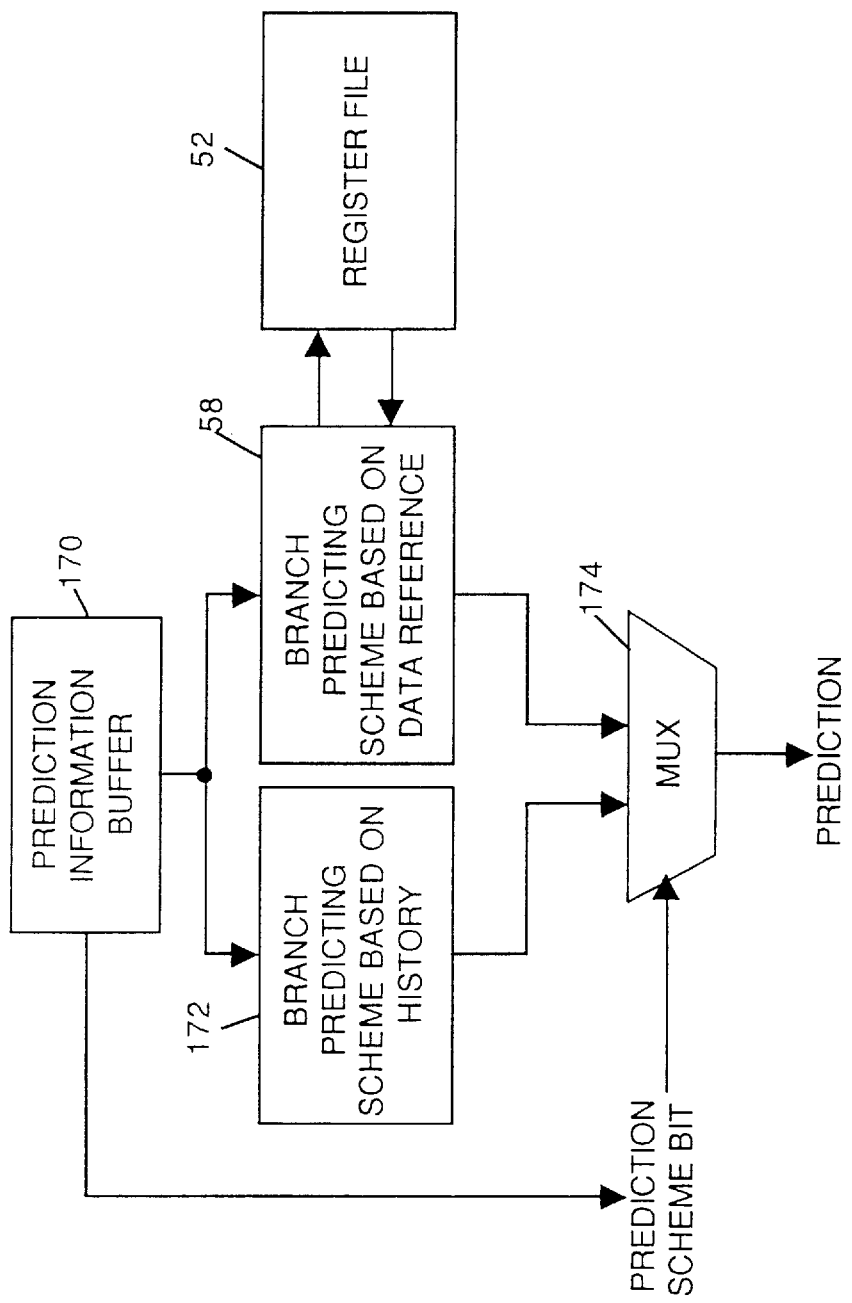
FIG. 19 is a block diagram of the branch predicting apparatus in accordance with the second embodiment of the present invention.

FIG. 19 is a schematic block diagram of the branch predicting apparatus in accordance with the second embodiment. Referring to FIG. 19, the apparatus includes a prediction information buffer 170, a branch predicting mechanism 58 based on data reference, a register file 52, a branch predicting mechanism 172 based on history, and a multiplexer 174. The branch predicting mechanism 58 based on data reference and register file 52 are similar to the branch predicting mechanism and the register files 58 and 52 of the first embodiment shown in FIG. 5.

The branch predicting mechanism 172 based on history is the branch predicting mechanism in accordance with the delayed slot method or BTB method described in the prior art above. BTB may be provided in prediction information buffer 170, or it may be provided separately.

Figures 20, 21:
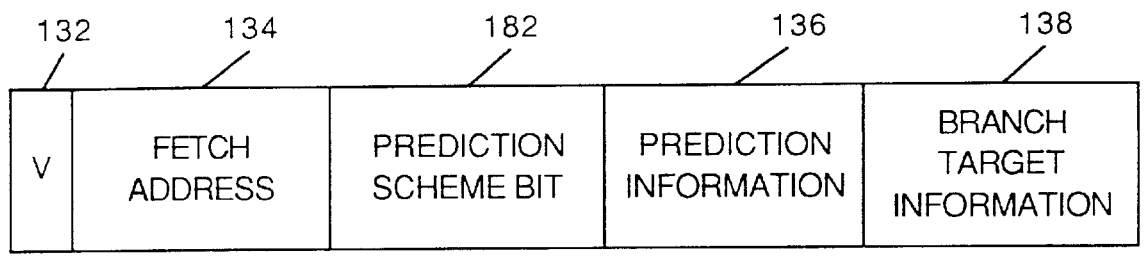
FIG. 20 schematically shows entries of prediction information buffer in accordance with the second embodiment.
FIG. 21 schematically shows relation between prediction scheme bit and prediction information in accordance with the second embodiment.

Format of each entry of prediction information buffer 170 is shown in FIG. 20. Referring to FIG. 20, an entry 180 is similar to the prediction information buffer entry 130 of the first embodiment shown in FIG. 16, except that it newly includes a prediction scheme bit 182. The prediction scheme bit is for designating the prediction scheme. As shown in FIG. 19, prediction information buffer 170 selects either the prediction output from the branch predicting mechanism 172 based on history or the prediction output from the branch predicting mechanism 58 based on data reference, by applying the prediction scheme bit to multiplexer 174.

Registration in prediction information buffer 170 is performed in the following manner. When a branch instruction is executed, whether the prediction of that instruction is to be performed by branch predicting mechanism based on history or data reference is determined, and in accordance with the result of determination, information is registered in a prediction information field of the prediction information buffer. When data reference prediction scheme is not applicable, the prediction scheme bit of the prediction information field is set to the prediction based on history, the result of execution of branching (history information) is registered in the prediction information, and it is updated. When data reference prediction scheme is applicable, the prediction scheme bit is set to data reference prediction scheme, and the register number of prediction fetch data, branch prediction operation and so on are registered and updated as prediction information.

Prediction is performed in the following manner. When prediction information is read from prediction information buffer 170 based on the address at the time of instruction fetch, branch predicting mechanism 172 based on history and branch predicting mechanism 58 based on data reference perform prediction respectively, and apply the results of prediction to multiplexer 174. Multiplexer 174 selects either of the results, in accordance with the prediction scheme bit output from prediction information buffer 170.

FIG. 21 shows the relation between the prediction scheme bit and prediction information buffer.

As prediction based on history is performed for a conditional branching which cannot be addressed by the data reference predicting scheme, hit rate of prediction can be improved.

[Third Embodiment]

In the embodiments above, prediction information is supplied by a buffer. Therefore, a hardware used only for the purpose of holding information is necessary. It is effective to improve the hit rate of a buffer so as to obtain high prediction hit rate. However, for that purpose, a large number of entries must be prepared in the buffer. This results in a large amount of hardware of the prediction information buffer. Such increase in hardware is not desirable. The third embodiment is characterized in that increase in the hardware is avoided, by supplying prediction information not using prediction information buffer. For this purpose, in the third embodiment, a field for storing prediction information of a prediction information executed next to a normal instruction is provided, and branch prediction is performed based on the field.

Figure 22:
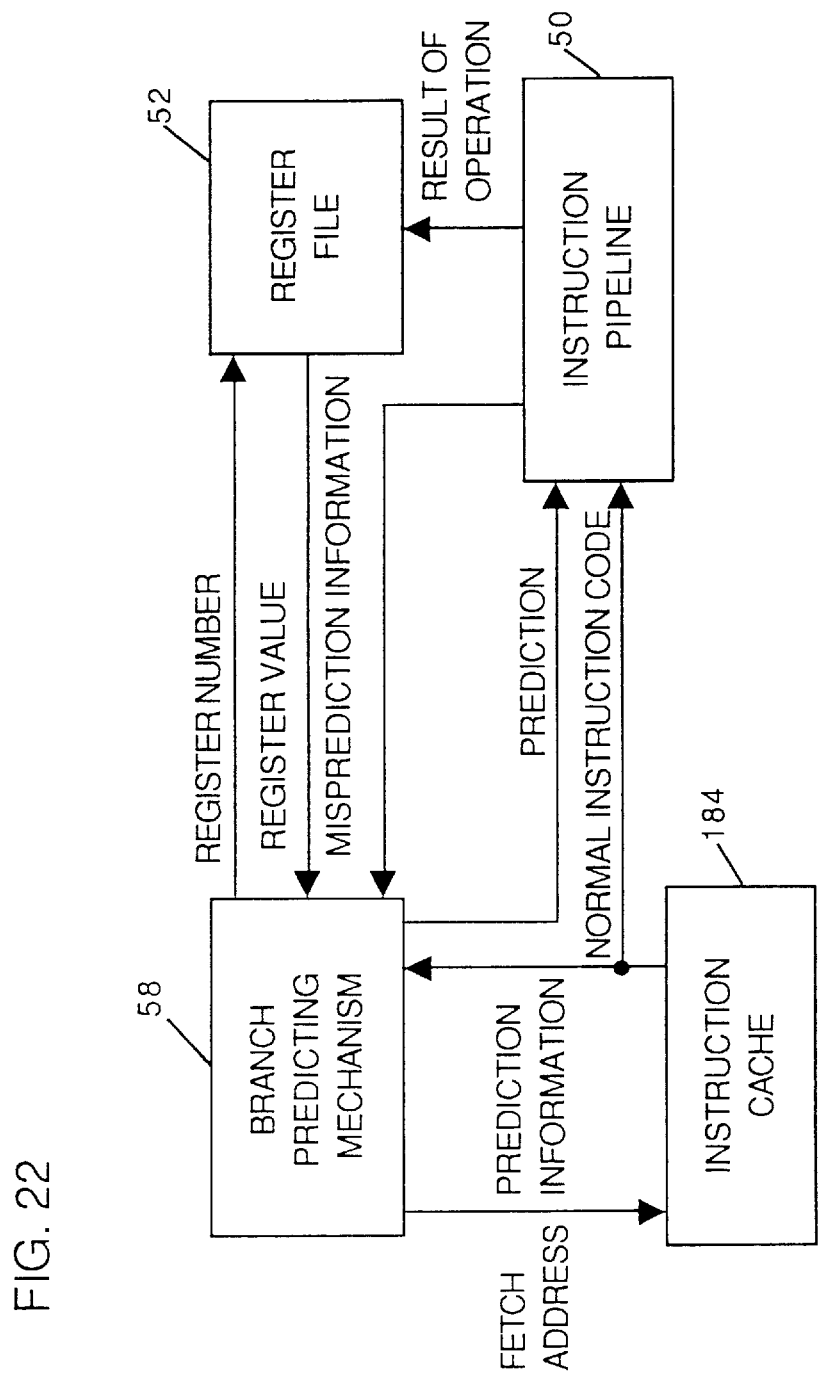
FIG. 22 is a block diagram of a branch predicting apparatus in accordance with the third embodiment of the present invention and peripheral circuitry.

Referring to FIG. 22, the branch predicting apparatus of the third embodiment includes a branch predicting mechanism 58, a register file 52, an instruction cache 184 and an instruction pipeline 50. Branch predicting mechanism 58, register file 52 and instruction pipeline 50 are similar to those denoted by corresponding reference characters in the first embodiment. Instruction cache 184 applies only the normal instruction code out of the instruction to instruction pipeline 50, and applies the information in the field of prediction information in the instruction as prediction information to branch predicting mechanism 58.

Figure 23:
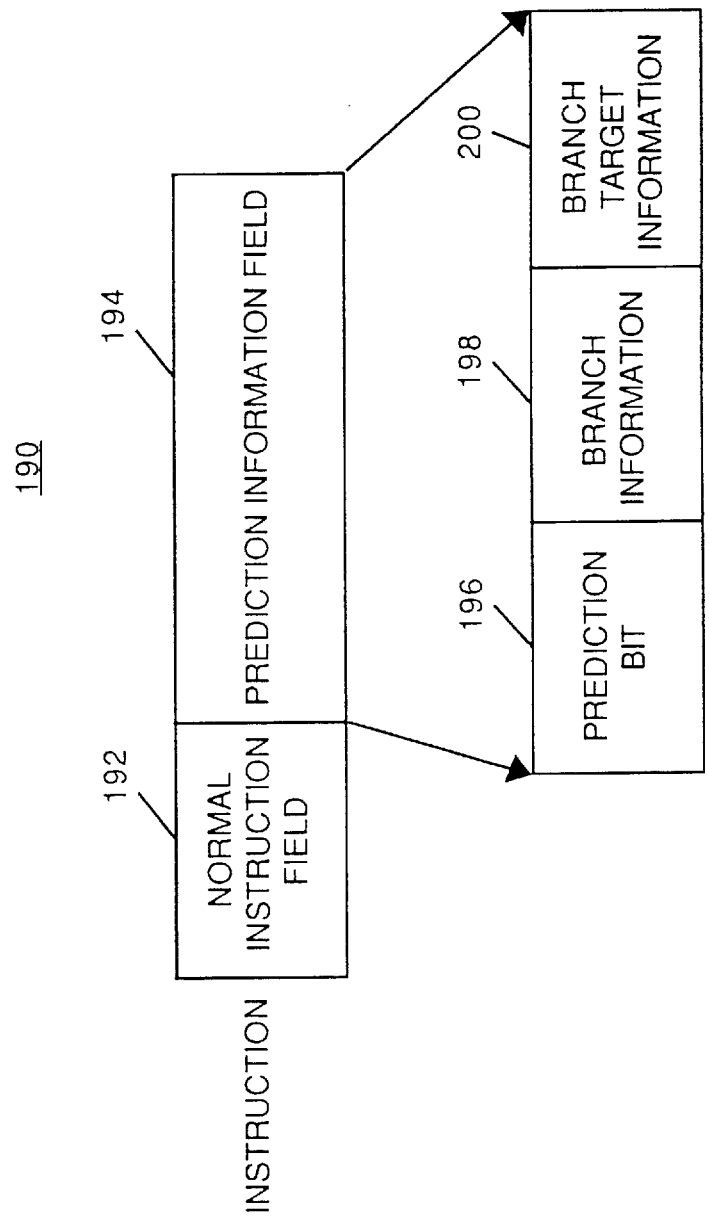
FIG. 23 schematically shows a format of an instruction in the third embodiment of the present invention.

Referring to FIG. 23, an instruction 190 includes a normal instruction field 192 and a field 194 of prediction information.

The field 194 of prediction information consists of a prediction bit 196, branch information 198 and branch target information 200.

Prediction bit 196 indicates whether branch prediction is to be carried out. Branch information 198 indicates content of prediction operation, register number of the register to be used, and so on, as mentioned above. Branch target information 200 indicates a branch target address. Alternatively, branch target information 200 may store an immediate value such as an offset in case of a PC relative branching.

The content of the field 194 of the prediction information is set by a compiler at the time of program compiling. For an instruction (which is referred to as "instruction for performing prediction") preceding a branch instruction, the prediction bit 196 is set, and branch information 198 and branch target information 200 are set in accordance with the precess of branching. When prediction is not carried out, prediction bit 196 is reset.

Branch predicting mechanism 58 refers to the prediction bit 196 of prediction information, and if is set, performs prediction in accordance with branch information.

In this example, it is assumed that the field of prediction information is provided in every instruction. However, the present invention is not limited thereto, and the field of branch information may be set to limited instructions. For example, the field may be provided only in the comparing instruction, part of addition instruction, or the like. Alternatively, scheduling may be constrained and an instruction having the field of prediction information may be placed at a position where prediction is performed, before the branch instruction.

The third embodiment is advantageous in that excessive hardware is not necessary for supplying branch prediction information. Different from the example in which prediction information buffer is provided, the prediction information is supplied always from the instruction. Therefore, branch prediction can be performed with the same accuracy as when the hit rate of prediction information buffer is 100% in the embodiment using the prediction information buffer.

[Fourth Embodiment]

In the method in which prediction information is supplied by a prediction information buffer, hardware used only for holding information is necessary. When the field of prediction information is provided in the instruction as in the third embodiment, the instruction set itself must be changed. Further, there is a possibility that the bit width of an instruction is increased. These should preferably be avoided. Therefore, in the fourth embodiment, simultaneously with fetching of an instruction denoted by a fetch address, the next instruction is fetched, and if the second instruction is a branch instruction, branch prediction information is obtained from the two fetched instructions, for performing branch prediction. The first fetched instruction is input to the pipeline as in the normal operation.

Figure 24:
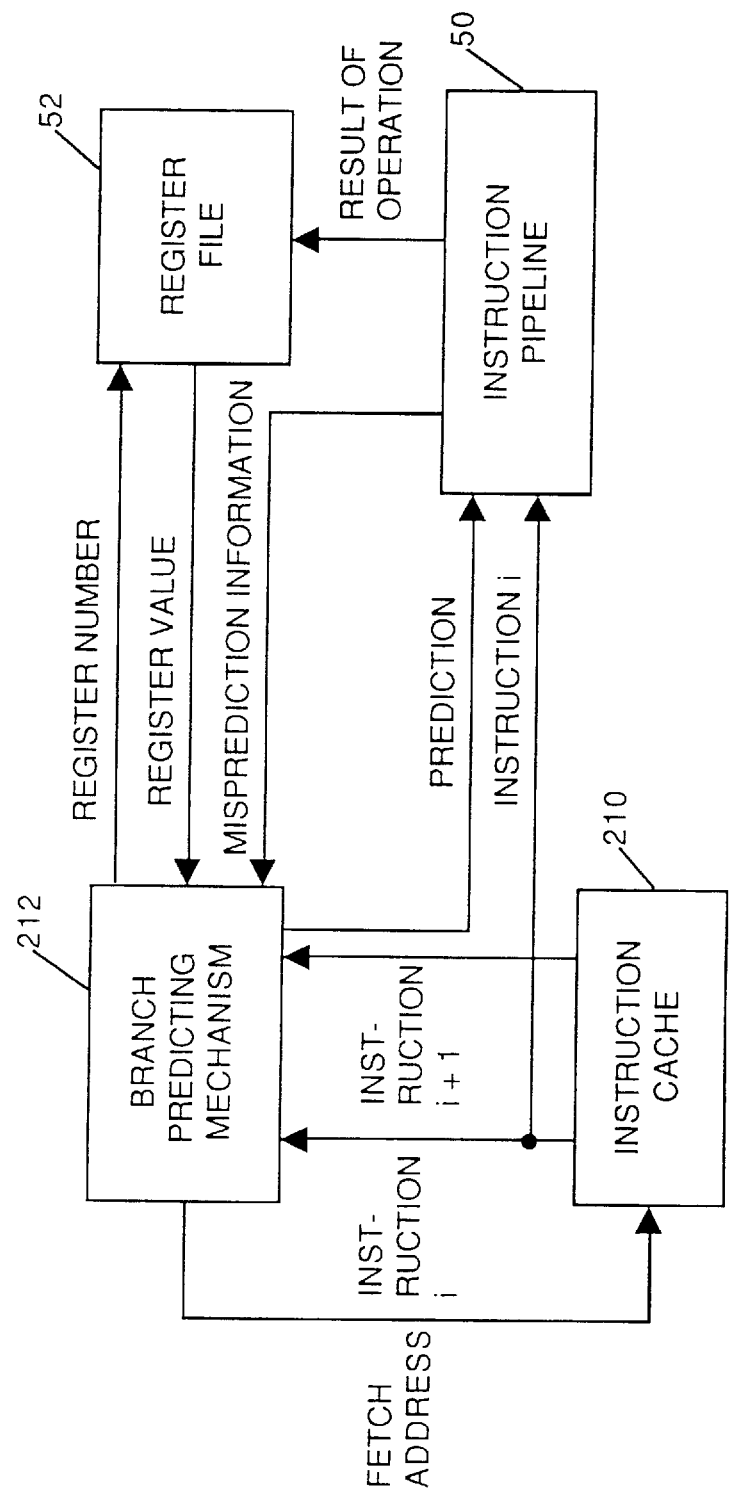
FIG. 24 is a block diagram of a branch predicting mechanism in accordance with a fourth embodiment of the present invention and peripheral circuitry.

Referring to FIG. 24, the branch predicting apparatus in accordance with the fourth embodiment includes a branch predicting mechanism 212, a register file 52, an instruction pipeline 50 and an instruction cache 210. Instruction pipeline 50 and register file 52 are similar to instruction pipeline 50 and register file 52 of the first embodiment.

Figure 25:
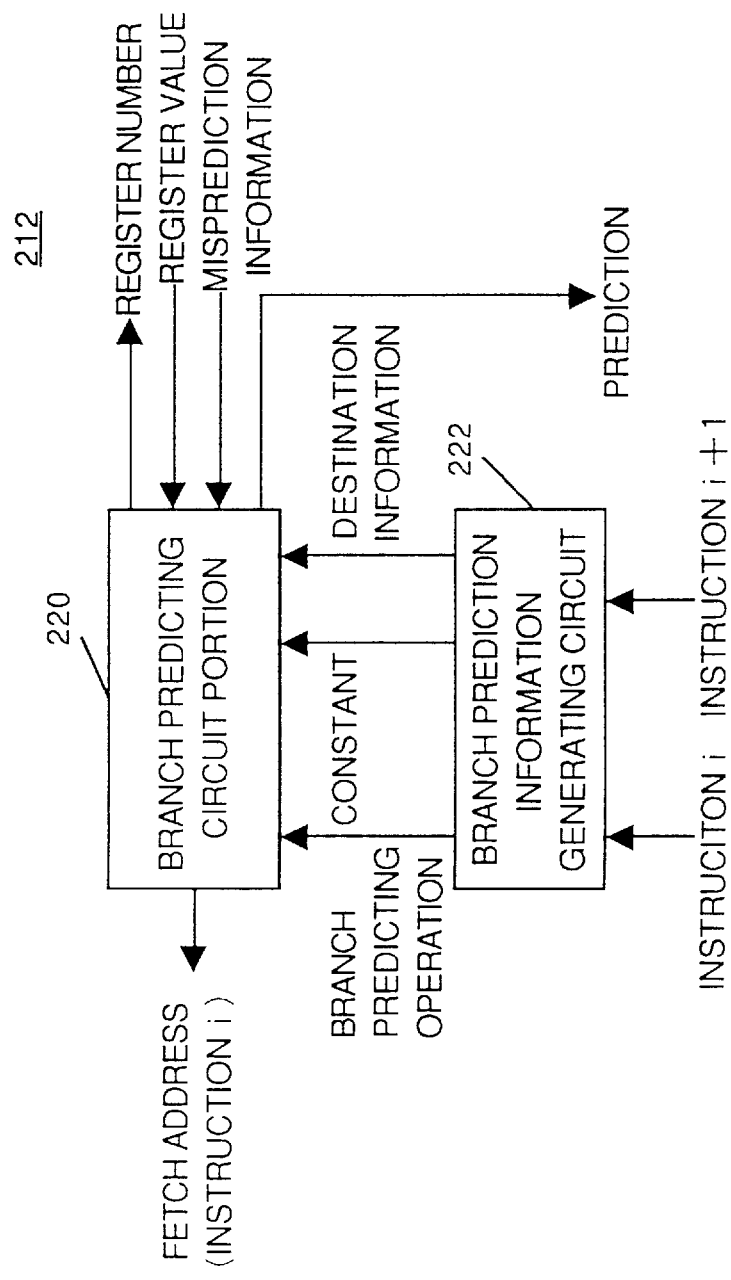
FIG. 25 is a block diagram of the branch predicting mechanism in accordance with the fourth embodiment of the present invention.

Referring to FIG. 25, branch predicting mechanism 212 of FIG. 24 includes branch prediction information generating circuit 222 which obtains two instructions from instruction cache 210 for generating and outputting branch prediction operation, constant, branch target information and so on from the fetched two instructions if the second instruction is a branch instruction; and branch predicting circuit portion 220 for performing branch prediction based on an output from branch prediction information generating circuit 220, by outputting a register number for reference to register file 52, if necessary, obtaining a register value from register file 52, and obtaining misprediction information from instruction pipeline 50.

The branch predicting apparatus of the fourth embodiment operates in the following manner. In each cycle, an instruction denoted by a fetch address and a next instruction are fetched by instruction cache 210. The first instruction (instruction i) is input to instruction pipeline 50 for normal processing, and it is also applied to branch predicting mechanism 212. The second instruction i+1 is not input to instruction pipeline 50 but only to branch predicting mechanism 212.

The branch predicting information generating circuit 222 of branch predicting mechanism 212 determines whether or not the second instruction is a branch instruction. If it is a branch instruction, it generates branch prediction operation, constant data, branch target information and so on based on the type of branching, the operand of branching and the pipe of the first instruction, and applies the generated information to branch predicting circuit portion 220. Branch predicting circuit portion 220 performs branch prediction in the similar manner as the branch predicting circuit portion already described in the above embodiments.

Figure 26:
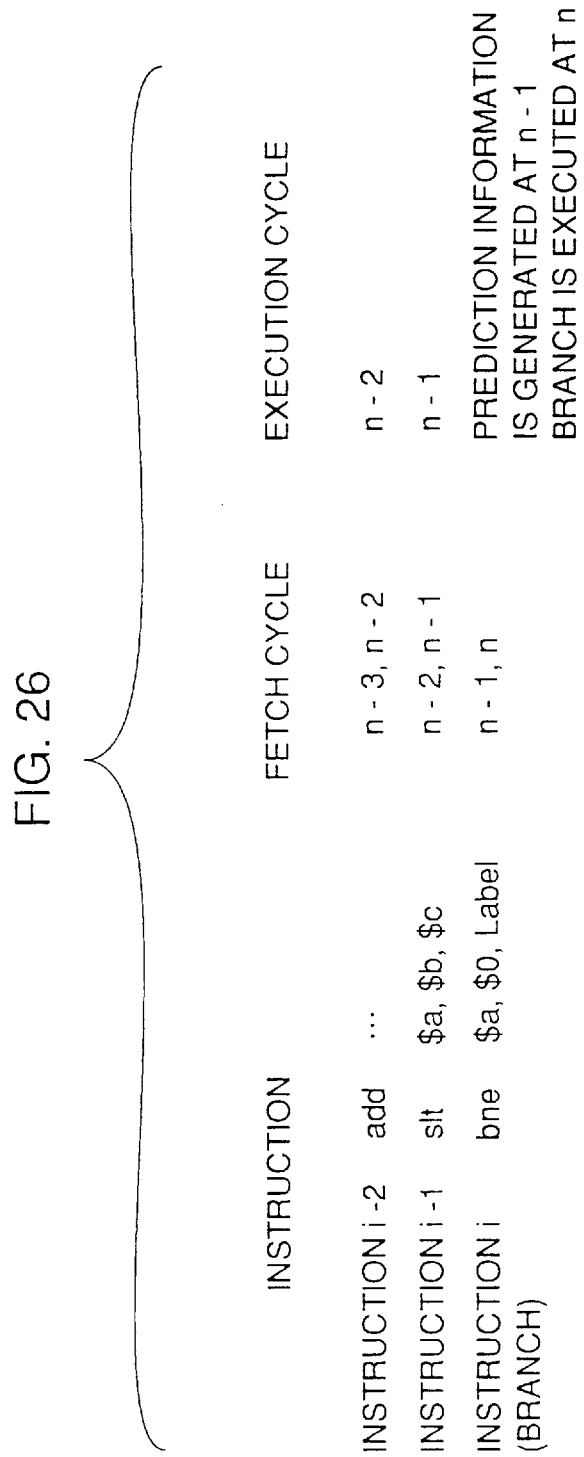
FIG. 26 is a schematic diagram showing an example of instruction codes in the fourth embodiment.

Let us consider an example in which an instruction code such as shown in FIG. 26 is executed. In a cycle n–2, instructions i–2 and i–1 are fetched, instruction i–2 is input to instruction pipeline, and instructions i–2 and i–1 are input to the branch predicting mechanism. Since instruction i–1 is not a branch instruction, prediction is not performed in this cycle.

In cycle n–1, instructions i–1 and i are fetched. Instruction i–1 is input to the instruction pipeline, and instructions i–1 and i are input to the predicting mechanism. Branch predicting information generating circuit 222 in the branch predicting mechanism recognizes that instruction i is a branch instruction, and generates the following prediction information. The prediction information is generated based on such an instruction and an operand as shown in FIG. 26.

As the prediction fetch data, $b is selected as src1, and $c is selected as src2. The branch prediction operation is "to output the result of magnitude comparison." The branch predicting circuit portion 220 performs prediction based on the prediction information.

In the first embodiment, prediction information is generated at the time of execution from the normal code. It is not necessary to prepare a special hardware such as a prediction information buffer for holding prediction information, and the same instruction code as in the prior art can be utilized.

[Fifth Embodiment]

In the fourth embodiment, branch prediction information is generated from two instructions, at the time of execution. However, such information is already available at the time of compiling of the instruction. Therefore, it is possible to newly prepare an instruction for holding the branch prediction information, and place the instruction at an appropriate position in the instruction code at the time of compiling. In the fifth embodiment, branch predicting information is obtained from the instruction in such a method, for branch prediction.

Figure 27:
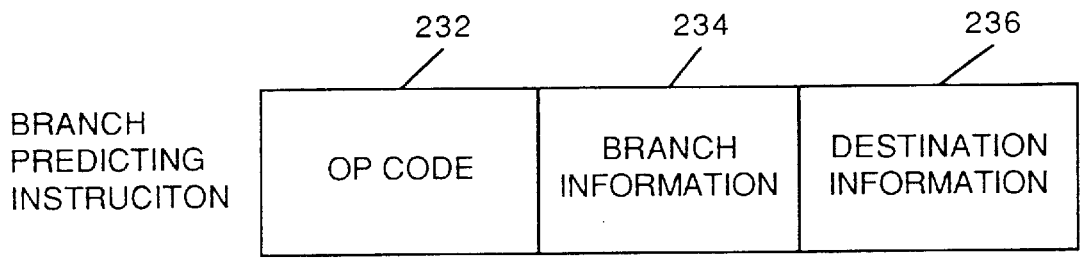
FIG. 27 schematically shows an instruction format in accordance with a fifth embodiment of the present invention.
Figure 28:
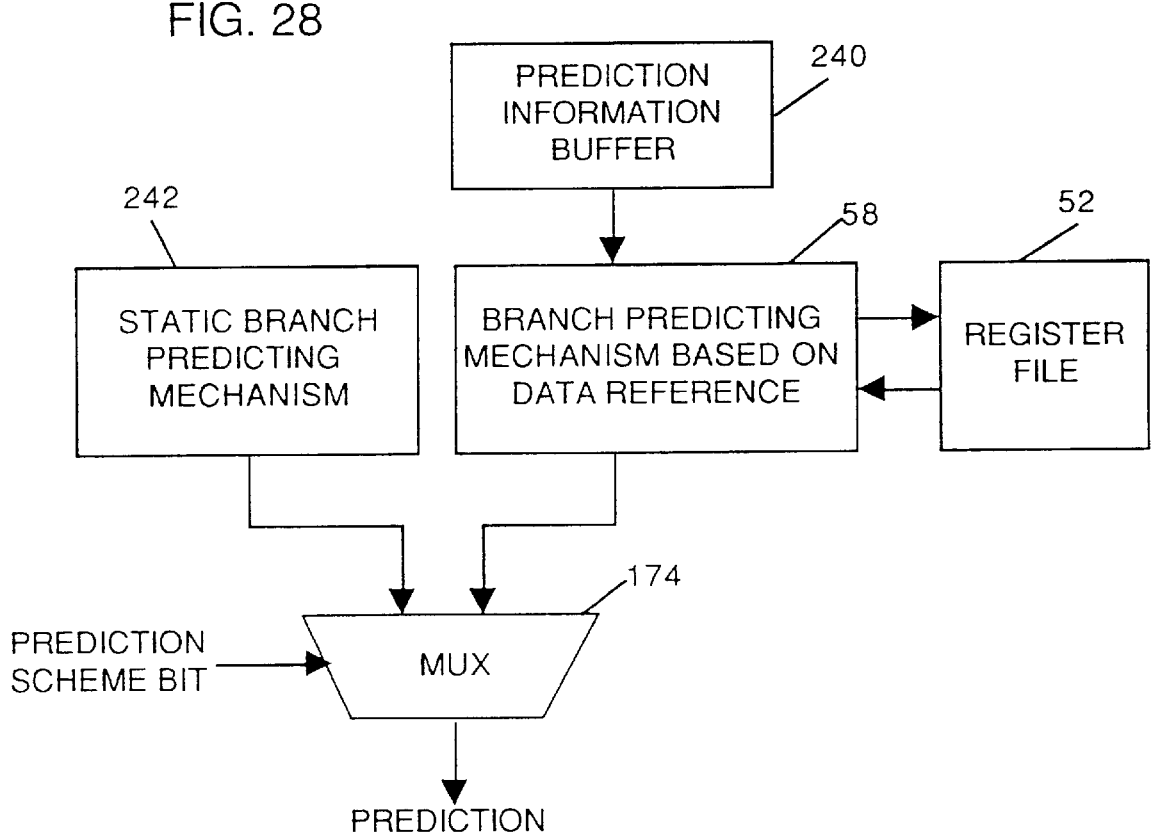
FIG. 28 is a block diagram of a branch predicting apparatus in accordance with a sixth embodiment of the present invention.

Referring to FIG. 27, a branch predicting instruction 230 is newly provided, which includes an OP code 232, branch information 234 and branch target information 236. OP code 232 indicates branch predicting instruction. Branch information 234 indicates prediction operation, register number and so on. Branch target information 236 includes a branch target address.

The compiler sets prediction information of the branch predicting instruction in accordance with the processing of branching, and schedules the branch prediction instruction at a position where prediction is performed.

An instruction read from instruction cache at the time of execution is simultaneously input to the instruction pipeline and the branch predicting mechanism. When the branch predicting instruction is recognized, branch predicting mechanism performs prediction in accordance with the branch information.

In this example, a circuit which extracts branch information and branch target information from one instruction and applies the same to branch predicting circuit portion 220 may be provided in place of branch prediction information generating circuit 222 shown in FIG. 25 of the fourth embodiment.

In this embodiment, it is not necessary to change the conventional instruction in the instruction set, and what is necessary is to add a new instruction. The bit width of an instruction is not increased. Further, it is not necessary to prepare excessive hardware for supplying branch prediction information.

In the embodiments above, branch prediction is carried out in an instruction predicting mechanism which is independent from instruction pipeline 50. However, operation in the branch predicting mechanism is possible also by utilizing instruction pipeline 50. Therefore, in an instruction pipeline in which operations are carried out in parallel by a plurality of processing apparatuses, branch predicting processing may be carried out by utilizing one such processing apparatus which is not used. In that case, an instruction fetched before the branch instruction and prediction information obtained from the prediction information buffer at the address of the instruction may be input simultaneously to the instruction pipeline and processed by separate processing apparatuses.

[Sixth Embodiment]

Registration in the prediction information buffer is performed by executing a branch instruction. Therefore, any branch, when executed for the first time, cannot be predicted. Further, when there is not sufficient number of entries in the prediction information buffer, it is possible that information of a certain branch which has been registered is replaced in the entries by execution of another branch, and when said certain branch is to be executed, necessary information is not registered. Prediction is not possible in that case. Further, dependent on the branch instruction, data to be referred to for prediction may not be available in time, and data reference prediction scheme is not applicable.

In the branch predicting apparatus of the sixth embodiment, data reference branch prediction is used in combination with static branch prediction, in order to solve the above described problems. A branch predicting apparatus using branch predicting mechanism based on data reference has not been known. Therefore, combination of the branch predicting scheme based on data reference with static branch predicting mechanism has not been disclosed in any document.

Referring to FIG. 27, the branch predicting apparatus of the sixth embodiment includes a prediction information buffer 240, a static branch predicting mechanism 242, a branch predicting mechanism 58 based on data reference, a register file 52, and a multiplexer 174. The branch predicting mechanism 58 based on data reference and register file 52 are similar to branch predicting mechanism 58 and register file 52 of the first embodiment.

The static branch predicting mechanism 42 may use any of the predicting methods mentioned in the third to fifth embodiments above. Multiplexer 174 selects prediction by the static branch predicting mechanism 242 or the branch predicting mechanism 58 based on data reference, in response to a prediction scheme bit prepared in the instructions, as will be described later.

Figure 29:
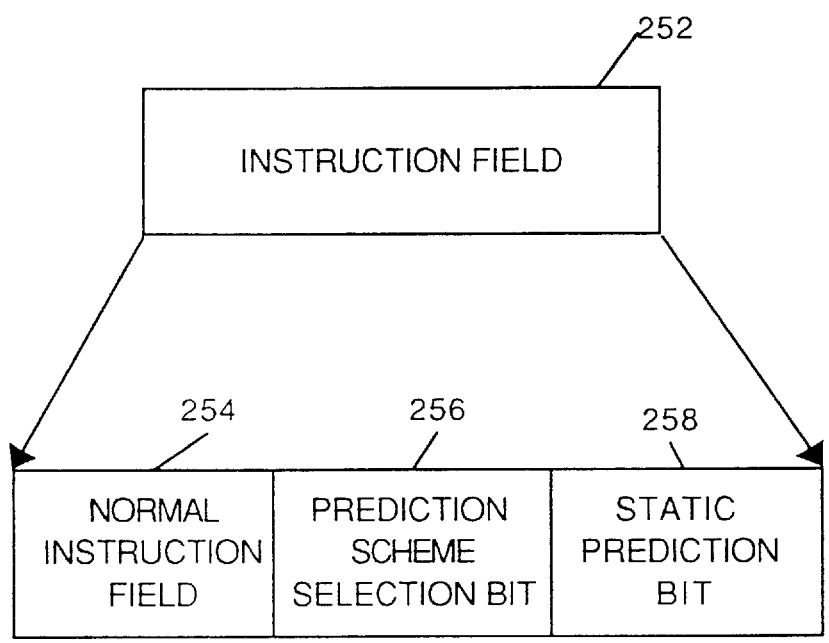
FIG. 29 schematically shows an instruction format of the second embodiment.

Referring to FIG. 29, the instruction 250 used in the sixth embodiment includes an instruction field 252 and prediction information field 194. In prediction information field 194, prediction information for static prediction is set in advance by the compiler.

Instruction field 252 includes a normal instruction field 254, a prediction scheme selecting bit 256 and a static prediction bit 258.

Prediction scheme selection bit 256 is information for selecting whether static prediction and prediction based on data reference is to be performed. Static prediction bit 250 is information for performing static branch prediction. The branch target information for finding the predicted branch target at the time of static prediction may be any of those described in the third to fifth embodiments above.

For a branch instruction which is predicted to be taken by the compiler, information for static branch prediction is set in the static prediction bit of the instruction which is fetched simultaneously with the timing of reference to the buffer corresponding to the branch instruction. When static prediction is to be performed with priority than prediction based on data reference, the prediction scheme selecting bit is set.

The apparatus of the sixth embodiment operates in the following manner.

(1) When the prediction scheme reference bit of the fetched instruction is set, prediction is performed based on the static prediction bit.

(2) When the prediction scheme bit is reset, the following operation is performed dependent on whether prediction information is registered in the buffer.
  (i) When prediction information is registered in the buffer, branch prediction is performed based on the data reference predicting scheme.
  (ii) When the prediction information is not registered in the buffer, static prediction bit is referred to and branch prediction is performed accordingly.

When such a predicting method as in the third embodiment is utilized in the static branch prediction of the sixth embodiment, the branch information 198 used for predicting direction of branching in the field 194 of predicting information shown in FIG. 23 (prediction operation, register number) can be obtained not from the instruction but from the data reference scheme using the prediction information buffer. Therefore, branch target information 198 of FIG. 23 can be omitted.

However, for this purpose, it is necessary to register the information in the prediction information buffer after the execution of the branch instruction. The registration is performed by the following process, at every execution of a branch instruction.

(1) When the prediction scheme reference bit is set, registration to the prediction information buffer is not carried out.

(2) When prediction scheme reference bit is reset, prediction information is registered in the prediction information buffer.

In this embodiment, every branch can be predicted, including its first execution. When the number of entries of the buffer is not sufficient and the registered information of branching is lost from the buffer, prediction effective to some extent is possible by static prediction. Further, prediction of such a branch instruction that cannot be well addressed by the data reference prediction scheme can be performed effectively to some extent. Therefore, it is expected that the hit rate of branch prediction is improved.

[Seventh Embodiment]

PC (Program Counter) relative branch instruction refers to a branch instruction in which branch target is calculated by PC+immediate value. Generally, the branch target address includes about 30 bits in a 32 bit architecture. However, in immediate value, it contains ten and several bits. Therefore, if branch prediction is possible by using the immediate value, it is possible to reduce each entry of prediction information buffer and to reduce the amount of hardware. The seventh embodiment relates to such prediction of branch target. Branch prediction can be divided into prediction of direction of branching, and prediction of branch target, which are independent from each other. As already described, direction of branching is predicted based on history or data reference. Both of these can be used in combination with the method of prediction of branch target described in the seventh embodiment.

Figure 30:
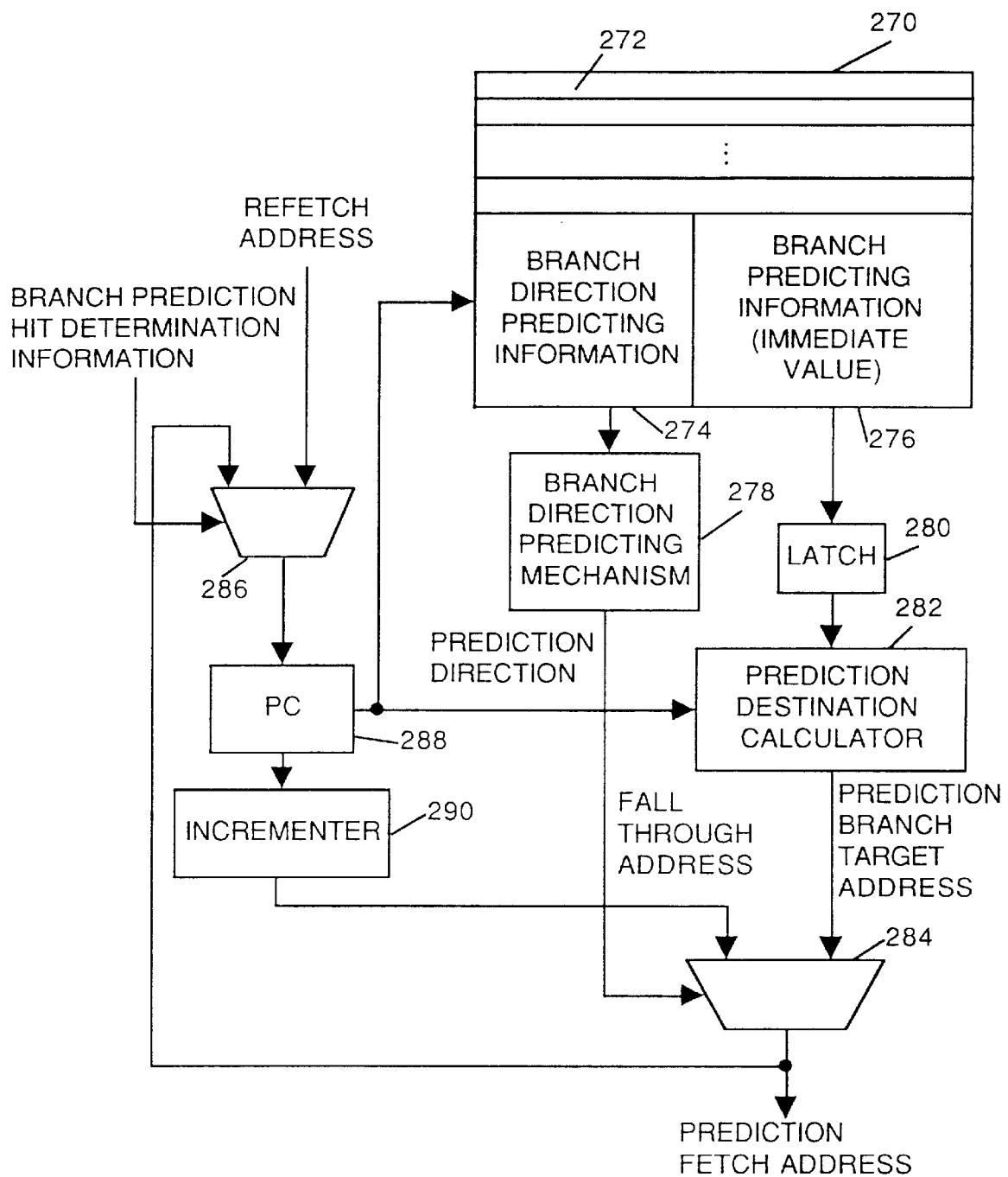
FIG. 30 is a block diagram of a branch predicting apparatus in accordance with a seventh embodiment of the present invention.

Referring to FIG. 30, the branch predicting apparatus includes a prediction information buffer 280, branch branch target predicting mechanism 278, a latch circuit 280, a multiplexer 186, a program counter (PC) 288, an incrementer 290, a branch branch target calculator 282 and a multiplexer 284.

The prediction information buffer includes a plurality of prediction information entries 272. Each entry 272 includes branch direction predicting information 274 and branch predicting information (consisting of the immediate value) 276.

To multiplexer 286, a re-fetch address and a prediction fetch address which is an output from multiplexer 284 are applied. Multiplexer 286 selects either the re-fetch address or the prediction fetch address in response to the branch prediction hit determination information, and sets the selected one at PC288.

Incrementer 290 calculates a fall through address by adding the bit width of a normal instruction to the value of PC 288, and applies the calculated address to multiplexer 284.

The branch direction predicting mechanism 278 may be the one based on history or the one based on data reference, as mentioned above. It predicts direction of branching in accordance with the branch direction predicting information 274. The predicted direction is applied to a control input of multiplexer 284.

Prediction branch target calculator 282 adds the content of PC 288 and the immediate value of branch prediction information 276 temporarily latched in latch circuit 280, and generates a prediction branch target address, and applies the same to another input of multiplexer 284. In accordance with the applied direction of prediction, multiplexer 284 selects the prediction branch target address when a branch is taken and selects the fall through address when branch is not taken, and outputs the selected one as prediction fetch address. This output is again applied to multiplexer 286.

The immediate value of the branch prediction information is registered when a PC relative branch instruction in which branch target is calculated by PC+immediate value is executed.

As for the methods of registration in the buffer and calculation of prediction branch target address, the methods differ dependent on the timing of reading the prediction information buffer 270.

Figure 31:
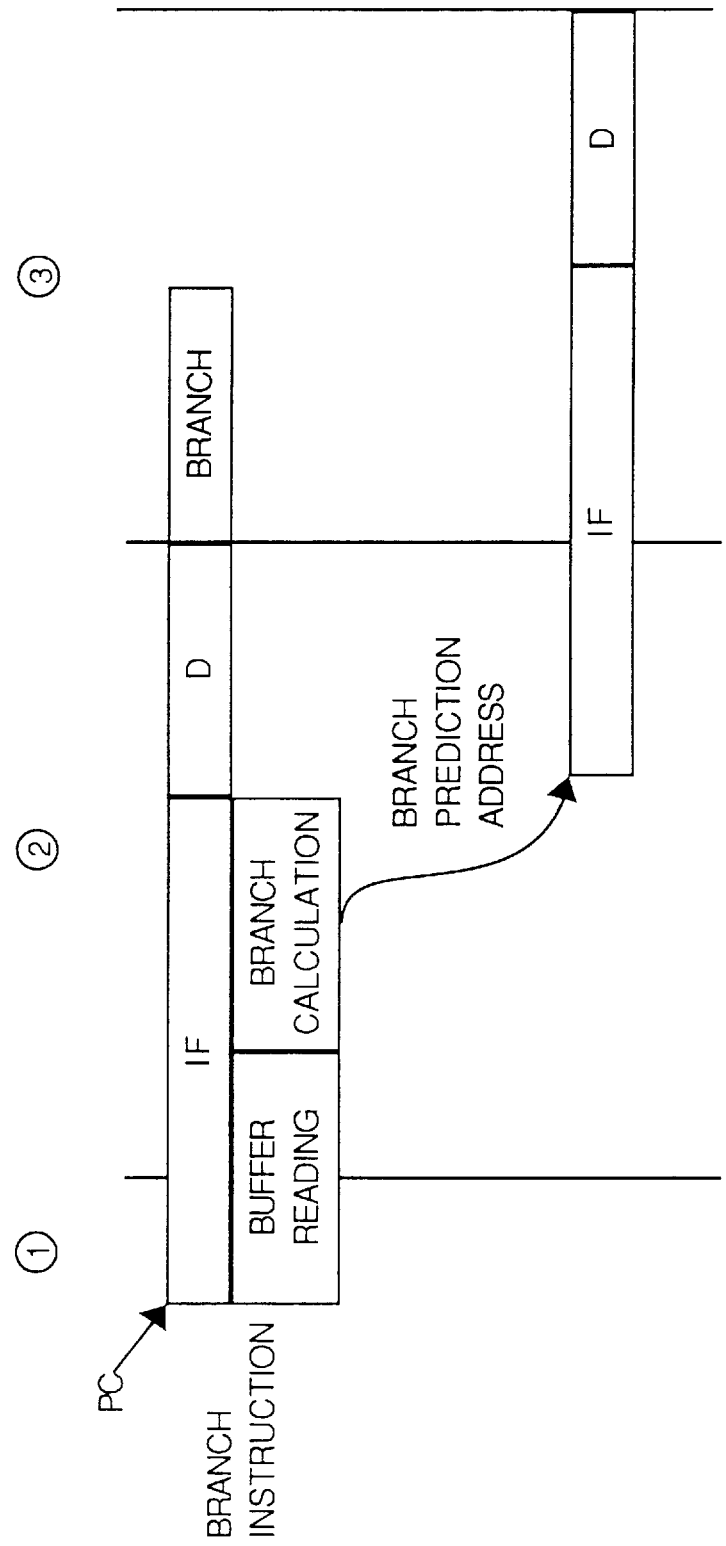
FIG. 31 schematically shows pipeline processing in the seventh embodiment.

(1) When reading of the buffer and calculation of prediction branch target can be performed within one cycle (FIG. 31)

In this case, immediate value of the branch predicting information is registered in the buffer by using an address which is fetched at the same timing as the branch instruction. At the time of prediction, the address used for reading the buffer matches the address of the branch instruction. Therefore, after reading of buffer, the read immediate value is used as an offset, branch branch target is calculated by PC+offset, and the next instruction is fetched. This is shown by the arrow in cycle 2 of FIG. 31.

Figure 32:
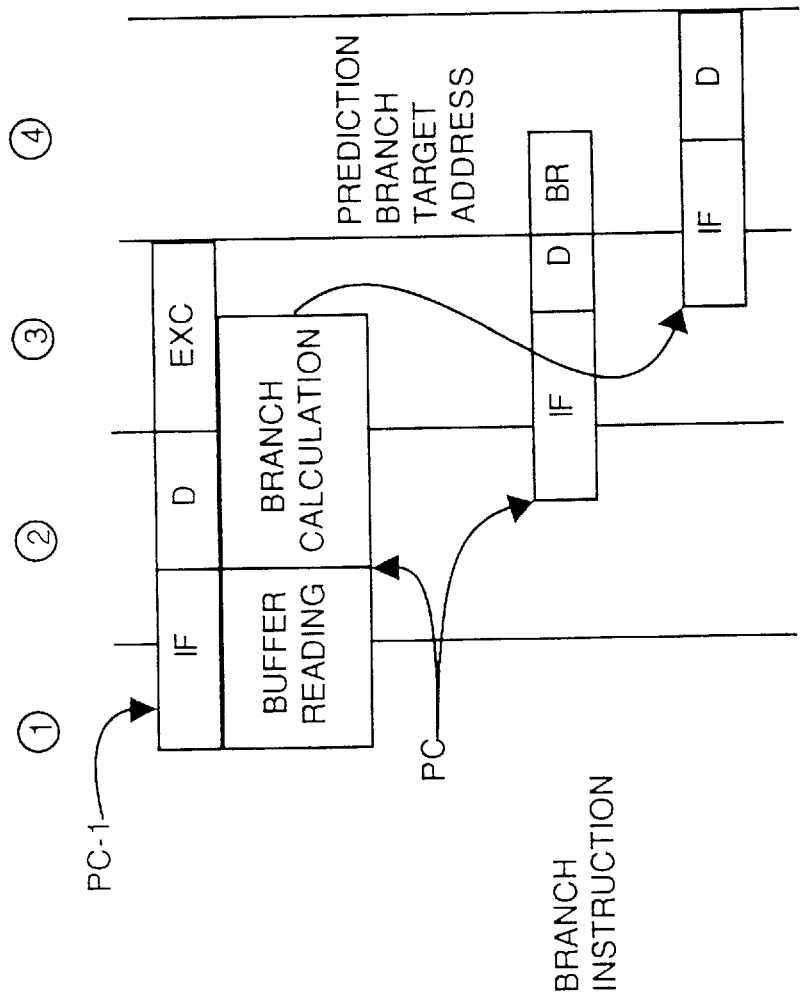
FIG. 32 schematically shows another pipeline processing in accordance with the seventh embodiment.

(2) When reading of the buffer and calculation of prediction branch target must be performed in separate cycles (FIG. 32)

Sometimes reading of the buffer and addition for generating prediction branch target take much time and these operations cannot be completed within one cycle. In that case, reading of the buffer must be performed one cycle before the branch instruction, allowing for the time necessary for generating prediction branch target address. Reading of the buffer is shown in cycle <1> of FIG. 32. At this time, the instruction fetched simultaneously is the address of (PC-1), which precedes by one the branch instruction.

More specifically, the address for reading of the buffer is the address of an instruction which is preceding the branch instruction. Reading of the buffer is completed amid the cycle <2>, and at this time, the branch instruction is fetched. Therefore, in the latter half of the cycle <2>, the address of branch instruction (PC) is obtained, and the immediate value read from the buffer is added thereto and branch branch target is calculated. In accordance with the prediction branch target address, the instruction of the prediction branch target is fetched amid the cycle <3>.

In the above example, the timing of calculating branching is determined taking into consideration the change of the program counter. Alternatively, at the time of registering the immediate value in the prediction information buffer, the difference over the address of the branch instruction may be added in advance to the immediate value for registration.

When prediction is performed based on data reference, the prediction information buffer is read in an earlier cycle than the fetching of the branch instruction. Therefore, when prediction is performed based on data reference, calculation of the prediction branch target must be performed taking into consideration such difference in the timing of reading.

In the seventh embodiment, the branch target information held in the prediction information buffer serves as the immediate value used for branch target calculation of the program counter relative. The immediate value has the bit width of ten and several bits, and therefore it is considerably smaller than the branch target address of a normal 32 bit architecture, which contains about 30 bits. Accordingly, each entry of the prediction information buffer can be reduced, and the amount of hardware of the prediction information buffer as a whole can be reduced. Alternatively, if the amount of hardware of the prediction information buffer is maintained, the hit rate of branch prediction is expected to be improved.

[Eighth Embodiment]

When the data read from a register is used as the prediction branch target in addition to the PC relative branch instruction mentioned in the seventh embodiment, it would be convenient as in the indirect method mentioned above. In the eighth embodiment, the prediction branch target can be calculated based on the data read from the register or PC+immediate value.

Figure 33:
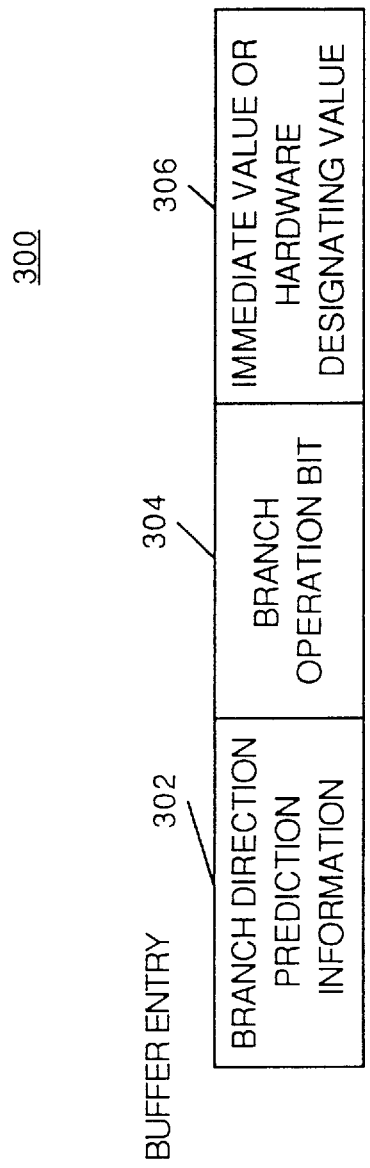
FIG. 33 schematically shows entries of prediction information buffer in accordance with an eighth embodiment of the present invention.

FIG. 33 shows a format of an entry 300 of the prediction information buffer. Referring to FIG. 33, each entry 300 includes branch direction prediction information 302, a branch operation bit 304, and an immediate value or a value designating a hardware (such as a register number) 306. Branch direction prediction information 302 includes prediction operation, register number or the like for predicting the direction of branch target, as already described. The branch operation bit (1 bit) is information for specifying the method of calculating the prediction branch target address. Since the present embodiment includes two methods, that is, one related to PC relative and one related to register reference, only 1 bit is necessary. The value 306 is an immediate value when the branch instruction is PC relative, and it is a register number storing the branch target address when the branch instruction requires register reference. The hardware storing the branch target address is not limited to the register in the register file, and it may be a register in the ALU.

Figure 34:
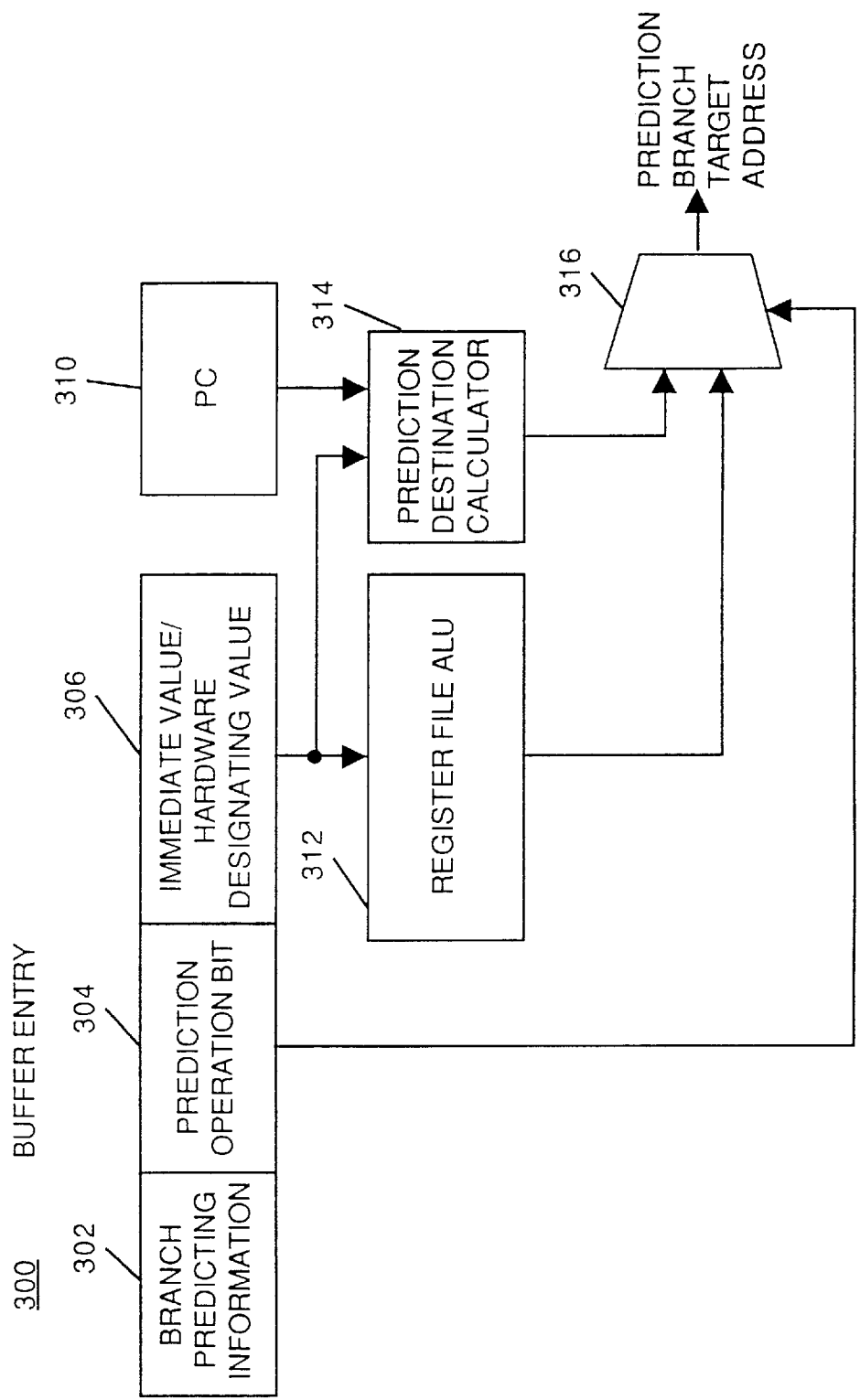
FIG. 34 is a schematic block diagram of the branch predicting apparatus in accordance with the eighth embodiment of the present invention.

Referring to FIG. 34, the branch predicting apparatus of the present invention includes a prediction branch target calculator 314 and a multiplexer 314. The prediction branch target calculator 314 adds the content of program counter 310 to the content of immediate value/hardware designating value 306, and applies the result to multiplexer 316. When the immediate value/hardware designating value 306 is the hardware designating value (register number), the register value of the corresponding register is applied from the register file or ALU 312 to another input of multiplexer 316. Multiplexer 316b selects and outputs as prediction branch target address, one of the output from prediction branch target calculator 314 or an output from the register of ALU 312 or register file, in response to branch operation bit 304.

Registration in prediction information buffer is performed by executing a branch instruction. When the branch instruction is a PC relative, the immediate value is registered as the branch target information, and branch target operation bit is set. If the branch instruction is based on register reference, the register number is registered as branch target information, and branch target operation bit is reset.

At the time of prediction, buffer is read, and if the branch target operation bit is set as shown in FIG. 34, an address read from the register designated by the PC+immediate value, and when it is reset, the address read from the register designated by the hardware designating value 306, is used as the prediction branch target address.

According to the eighth embodiment, branch target address can be predicted not only for a branch instruction of a PC relative using PC+immediate value, but also for a branch instruction based on register reference.

[Ninth Embodiment]

Figure 35:
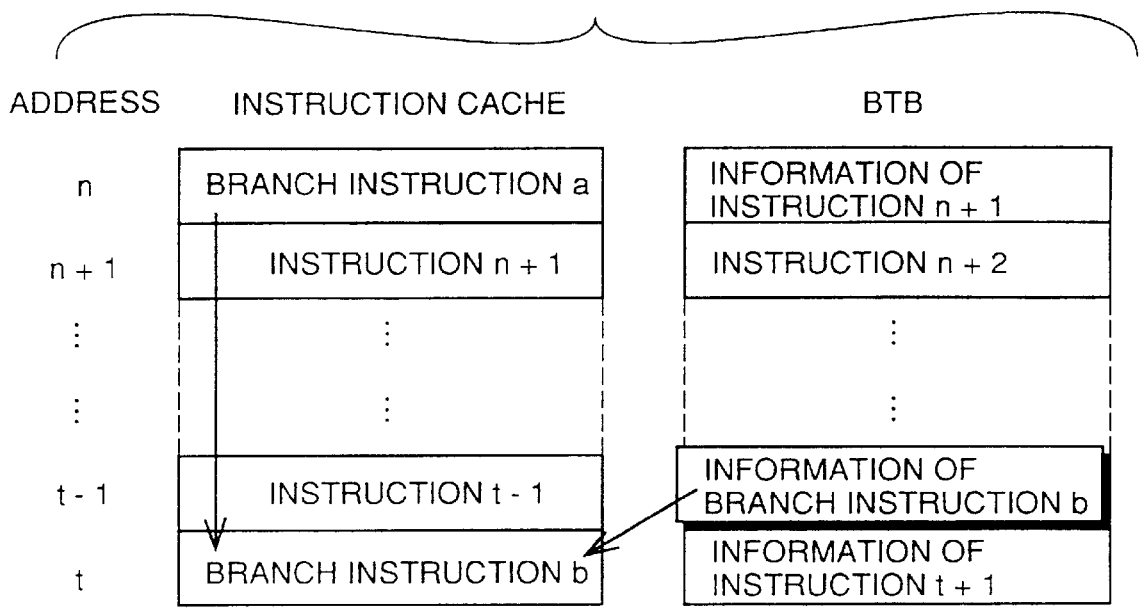
FIG. 35 schematically shows contents of instruction cache and BTB when branch prediction information is stored in an address statically immediately preceding the branch instruction.

In the above described embodiments, registration of an entry of a buffer (BTB) of prediction information in the method in which displacement is held as branch target information is performed in the following manner. Referring to FIG. 35, assume that an instruction t-1 is stored at an address t-1 of the instruction cache, and a branch instruction b is stored at address t, respectively. If the information necessary for branch prediction is within 1 cycle, then the information necessary for branch prediction of branch instruction b is stored in an address preceding by one the branch instruction b, that is, in address t-1. Namely, the branch prediction information of branch instruction b is stored at address t-1 of the BTB.

Since the branch prediction information is registered in the BTB in this manner, branch prediction can be performed in the following manner. When instruction t-1 is fetched from the instruction cache, the information of branch instruction b is read by designating the address of the BTB by the address t-1. By the time the instruction next to the branch instruction b is fetched, branch prediction of branch instruction b is performed.

FIG. 35 shows an example in which processes necessary for branch prediction can be done within one cycle. If processing necessary for branch prediction takes two cycles, the branch prediction information of branch instruction b (address t) is at the address t-2 of the BTB. When the branch prediction information for a branch instruction is statically registered in an address of the BTB preceding by several addresses the branch instruction, the following problem arises.

Figure 36:
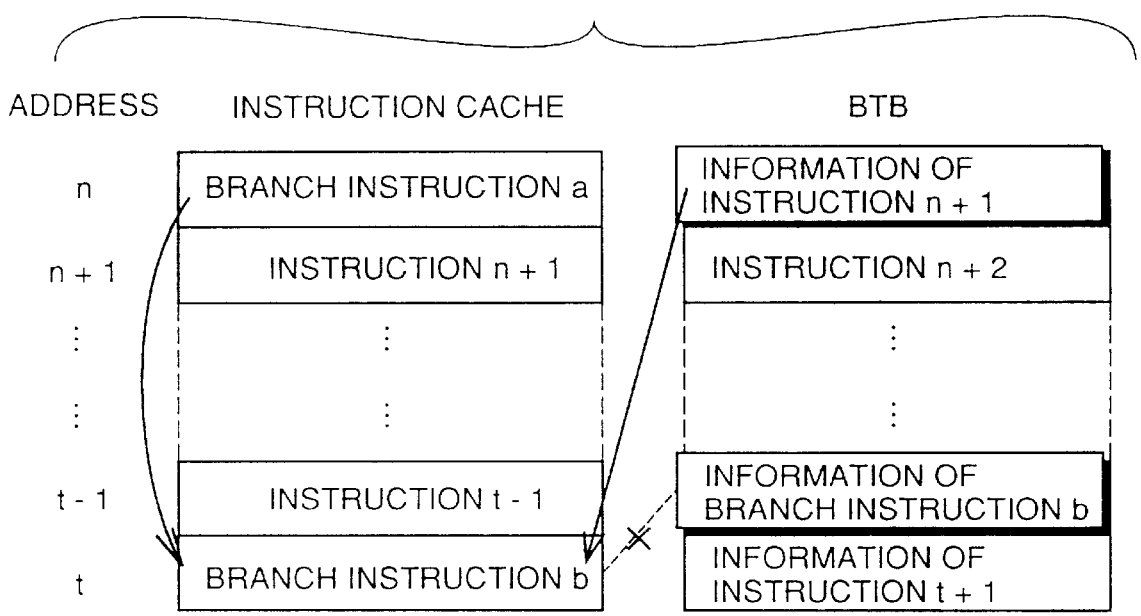
FIG. 36 is a schematic diagram showing a fetch address of branch prediction information when there is a branch instruction at a branch target of another branch instruction, in FIG. 35.

Referring to FIG. 36, assume that there is a branch instruction a at an address n. It is assumed that the control is transferred to branch instruction b as a result of execution of branch instruction a. In this case, the instruction fetched one cycle before the branch instruction b is not the instruction t-1 but the branch instruction a. Therefore, the BTB address when the instruction is fetched one cycle before the branch instruction b is n. What is stored at the address n of the BTB is, according to the method described above, the branch prediction information of the instruction n+1 stored at address n+1 of the instruction cache. Therefore, when branch prediction of branch instruction b is performed in accordance with the branch prediction information, correct result of prediction cannot be obtained. Namely, when there is a branch instruction at the branch target of another branch instruction, prediction information of the second branching cannot be obtained, and as a result, correct prediction is impossible.

The ninth embodiment is to solve such a problem.

Figure 37:
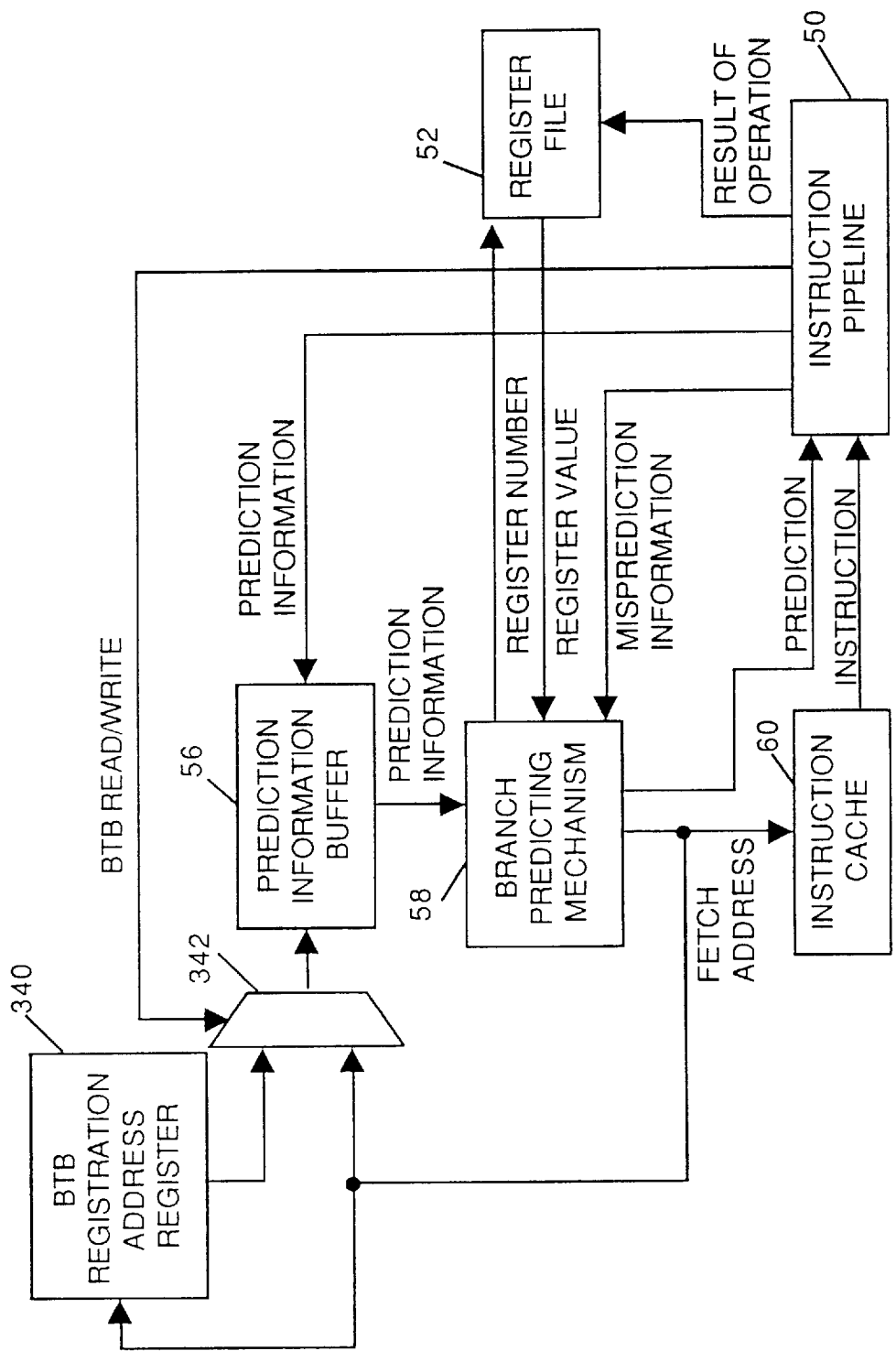
FIG. 37 is a block diagram of a branch predicting apparatus in accordance with a ninth embodiment of the present invention.

Referring to FIG. 37, the branch predicting apparatus of the ninth embodiment includes an instruction pipeline 50, a register file 52, a prediction information buffer 56, a branch predicting mechanism 58 and an instruction cache 60 and, in addition, a BTB register address register 340 consisting of an FIFO memory for temporarily storing only three cycles of the addresses of instruction fetch output from the branch predicting mechanism and outputting the stored addresses in the first in first out manner, and a selector 342 receiving an instruction fetch address and BTB register address register 340, responsive to the write/read control signal (BTB read/write) applied from instruction pipeline 50 attaining a value indicating update request of prediction information buffer 56, for applying the output from BTB register address register 340 to prediction information buffer 56 and otherwise for applying the address of the current instruction fetch to prediction information buffer 56.

Instruction pipeline 50, register file 52, prediction information buffer 56, branch prediction mechanism 58 and instruction cache 60 are similar to those of the branch predicting apparatus of the first embodiment shown in FIG. 5. Therefore, details thereof are not repeated. The blocks shown in FIG. 37 differ from the blocks shown in FIG. 5 in that prediction information output from instruction pipeline 50 is directly applied to prediction information buffer 56. The read/write control signal applied to selector 342 is the same as that applied from instruction pipeline 50 to prediction information buffer 56.

The number of stages of the BTB register address register 340 depends on the processors necessary for branch prediction. In the present embodiment, for example, hit or miss of prediction and branch target of the prediction are found at the end of the second cycle from the start of fetching of the branch instruction at address i. Therefore, the BTB register address register 340 includes three stages.

The branch predicting apparatus shown in FIG. 37 operates in the following manner. In the normal branch prediction, selector 342 selects a fetch address and applies the same to prediction information buffer 56. Prediction information buffer 56 outputs prediction information based on the applied address, to the branch predicting mechanism 58.

When the branch prediction is missed, selector 342 selects an output from BTB register address register 340 and applies the same to prediction information buffer 56. Prediction information buffer 56 stores the prediction information applied from instruction pipeline 50 to the address applied from selector 342. The BTB register address register 340 outputs an address of an instruction which is fetched earlier by one the address of that branch instruction on which branch prediction is performed and hit or miss of the prediction has been found. Therefore, the address of the prediction information stored in prediction information buffer 56 is the address fetched preceding by one the branch instruction. Namely, the address of the prediction information stored in prediction information buffer 56 is not the address preceding by one statically the branch instruction, but an address preceding by one dynamically, in a sense that it is the address of the last executed instruction.

Figure 38:
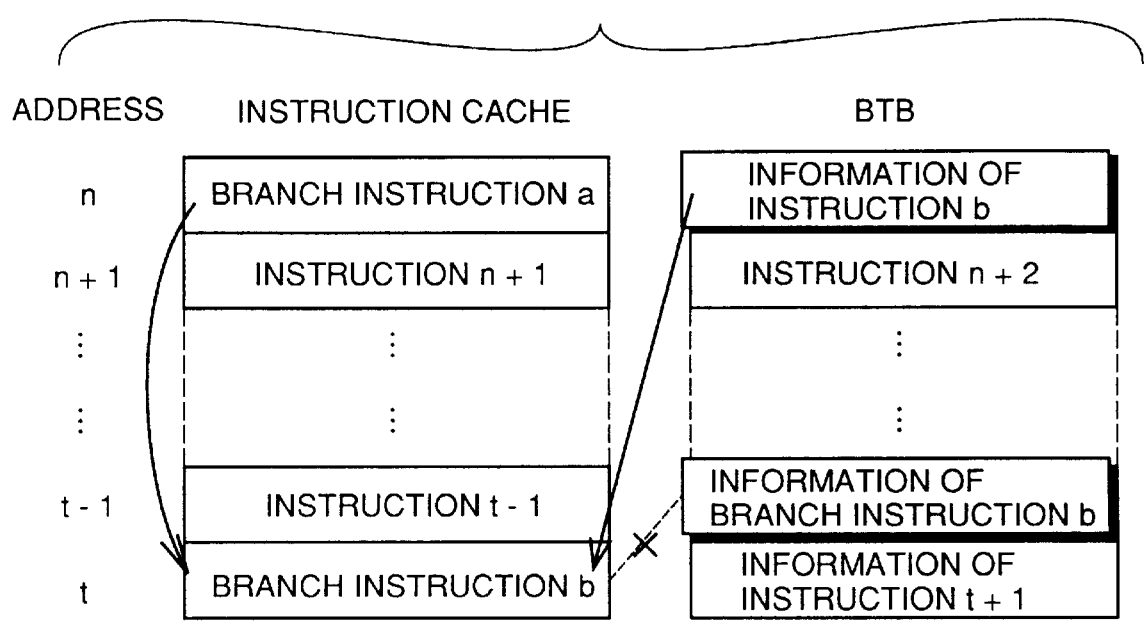
FIG. 38 schematically shows outline of registration of prediction information of the BTB buffer in accordance wi the ninth embodiment of the present invention.

Referring to FIG. 38, the following effects can be obtained. When the branch instruction a of address n is fetched, the prediction information of address n of the BTB is fetched simultaneously. Assume that the fetched content of the BTB is information not related to the prediction information of the branch instruction b at first.

Then, it is assumed that as a result of execution of branch instruction a, the control is transferred to branch instruction b. When the branch instruction b is executed, the branch target is known. Meanwhile, whether the result of prediction based on the prediction information read from the BTB is a hit or a miss can be found. Under the circumstance mentioned above, the branch prediction of branch instruction b is a miss. Therefore, in this case, the branch information of the branch instruction b is written in address n of the BTB.

Then, when branch instruction a is fetched, the information simultaneously fetched from the BTB is the prediction information for the branch instruction b. When the control branches to the branch instruction b as a result of execution of branch instruction a, the probability of a hit of branch target predicted based on the prediction information read from the BTB becomes higher, as in the case when the prediction information of prediction instruction b is read from the address preceding by one statically the branch instruction b. As a result, even when there is a branch instruction b at the branch target of another branch instruction a, the probability of a hit of branch prediction of the branch instruction b is higher. Further, every time there is a miss hit, prediction information of a branch instruction is written in an address of an instruction fetched earlier by one dynamically than the branch instruction is written. Therefore, once a miss occurs, the probability of hits of branch prediction of the branch instruction can be improved, as compared with the embodiments above. Further, since BTB registration is carried out in accordance with the instruction address fetched earlier by one dynamically, correct prediction information can be obtained even when the direction of branching of a branch instruction is biased and the same instruction code is fetched repeatedly, for the branch instruction existing at the branch target.

Though some embodiments of the present invention have been described, the present invention is not limited to these, and various modifications can be made within the scope defined by the claims. Specifically, in the embodiments above, branch predicting processes in a computer in which one instruction is executed at a time have been described. However, it is apparent to those skilled in the art that the present invention is applicable not only to such computers but also to branch predicting processes of a so called super scalar computer in which a plurality of instructions can be fetched at one time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A branch predicting apparatus in a processor of a pipelined architecture, having means for storing a result of operation, comprising:

prediction information supplying means for supplying at a same timing as fetching of an instruction fetched before a branch instruction, prediction information related to branch prediction of a branch instruction, the prediction information specifying where information to be referred to by the branch instruction is stored in said means for storing; and branch predicting means for reading, if necessary, information, specified by said prediction information necessary for branch prediction, from said means for storing, for performing branch prediction of said branch instruction by, at the latest, completion of a fetch cycle of said branch instruction and for outputting a branch prediction signal used in prefetching instructions to be executed subsequent to said branch instruction.

2. The branch predicting apparatus according to claim 1, wherein said branch predicting means includes means for inputting the branch information supplied by said prediction information supplying means and the information necessary for branch prediction to a pipeline at a same timing as fetching of the instruction fetched before said branch instruction, permitting branch predicting operation by the pipeline.

3. The branch predicting apparatus according to claim 1, wherein said means for storing result of operation includes a plurality of registers, said prediction information includes a resister number of one of said plurality of resisters which holds data to be referred to by the branch instruction, and said branch predicting means reads data necessary for branch prediction from the register which has a register number included in said prediction information.

4. The branch predicting apparatus according to claim 3, wherein said branch predicting means includes prediction information decoder means interpreting the prediction information related to branch prediction, for outputting designation information for designating one of said plurality of registers to extract information necessary for branch prediction, branch prediction operation information specifying an operation for branch prediction to be performed on the information necessary for branch prediction extracted from one of said plurality of registers, constant data used for branch prediction, and branch target information used for calculating prediction branch target address;

branch predicting circuits for performing an operation specified by the branch prediction operation information and constant data on the information necessary for branch prediction output from one of said plurality of resisters having said resister number, for outputting said branch prediction signal;

branch target address generating means for generating said prediction branch target address based on said branch target information; and fetch address generating means for outputting a fetch address of a branch prediction instruction based on an output from said branch target address generating means, an output from said branch predicting circuit, misprediction information applied from said pipeline and on an output from said fetch address generating means.

5. The branch predicting apparatus according to claim 1, wherein said branch predicting means performs branch prediction based only on a part of the information necessary for branch prediction.

6. The branch predicting apparatus according to claim 1, further comprising compressing means for compressing the information necessary for said branch prediction in accordance with a prescribed manner;

said branch predicting means performs branch prediction in accordance with the information compressed by said compressing means.

7. The branch predicting apparatus according to claim 6, wherein said compressing means applies a sign bit of the information necessary for branch prediction, a logic sum of every several bits of higher bits of the information necessary for branch prediction, and a plurality of lower bits of the information necessary for branch prediction, as said information necessary for branch prediction, to said branch predicting means.

8. The branch predicting apparatus according to claim 4, wherein said branch predicting circuit includes magnitude comparing means for comparing magnitude of two inputs and determining a branch target in accordance with a result of comparison, by performing subtraction between the two inputs and providing a sign of the results, one of the two inputs of said magnitude comparing means is adapted to receive an input from one of said registers, said branch predicting circuit further includes complement means for outputting a 2's complement of the other input of said information holding means, and selecting means for selecting either an input from another one of said plurality of registers or an output from said complement means in response to said branch prediction operation information, and applying the selected one to the other one of the two inputs of said magnitude comparing means, whereby said magnitude comparing means is also capable of performing addition of information applied to the two inputs.

9. The branch predicting apparatus according to claim 8, wherein said branch predicting circuit further includes match comparing means for determining whether an output from said magnitude comparing means and an input from said information holding means or said constant data match each other, and selecting means responsive to said branch prediction operation information for selecting one of the outputs from said magnitude comparing means and said match comparing means.

10. The branch predicting apparatus according to claim 4, wherein said prediction information supplying means supplies one of an immediate value for specifying a branch target address and a register number of one of said plurality of registers holding information specifying the branch target, and branch predicting operation information specifying a method of calculating the branch target, and said branch predicting circuit generates the branch target address by performing a calculation specified by said branch predicting operating information on said immediate value or said register number.

11. The branch predicting apparatus according to claim 1, further comprising:

branch predicting mechanism based on history, for performing branch prediction of a branch instruction in accordance with a history of the branch instruction; and history information holding means for holding the history of the branch instruction; wherein said prediction information supplying means supplies prediction scheme specifying information for specifying a scheme of prediction to be selected, said branch predicting apparatus further comprising scheme selecting means for selecting either an output from said branch predicting means or an output from said branch predicting mechanism based on history, in response to said prediction scheme specifying information.

12. The branch predicting apparatus according to claim 1, wherein said prediction information supplying means includes a prediction information buffer for temporarily storing prediction information applied from the pipeline.

13. The branch predicting apparatus according to claim 1, wherein an instruction is formatted to be able to include prediction information of branching, and said prediction information supplying means includes means for extracting and supplying prediction information from the instruction.

14. The branch predicting apparatus according to claim 13, wherein an instruction is provided with a normal instruction field and a prediction information field for holding prediction information of a branch instruction to be executed next, and said predicting information supplying means inputs content of the normal instruction field to the pipeline, and extracts the prediction information from the prediction information field of the instruction and supplies the information to said branch predicting means.

15. The branch predicting apparatus according to claim 1, wherein said prediction information supplying means includes means for fetching consecutive two or more instructions at one time, responsive to last one of the fetched instructions being a branch instruction, obtaining branch prediction information from said fetched two or more instructions and applying to said branch predicting means.

16. The branch predicting apparatus according to claim 13, wherein a branch prediction information holding instruction for holding the branch prediction information is provided in said instruction system, and said prediction information supplying means includes means for extracting and supplying the branch prediction information from said branch prediction information holding instruction.

17. The branch predicting apparatus according to claim 1, further comprising a static branch predicting mechanism; wherein each instruction includes prediction scheme specifying information for specifying a scheme of branch prediction performed on a branch instruction to be executed next, said prediction information supplying means extracts and supplies the prediction scheme specifying information from a fetched instruction, said branch predicting apparatus further comprising scheme selecting means for selecting either an output from said branch predicting means or an output from said static branch predicting mechanism, in response to said prediction scheme specifying information.

18. The branch predicting apparatus according to claim 1, wherein said branch predicting apparatus receives a write/read control signal from an apparatus executing an instruction, said write/read control signal indicating an update request of branch information when branch prediction is missed and indicating an output information of prediction information when an instruction is fetched;

said prediction information supplying means includes branch prediction information buffer responsive to said write/read control signal reaching a value indicating the update request, for storing the prediction information applied from said pipeline in a designated address, and responsive to said write/read control signal attaining a value indicating an output request, for outputting the prediction information from the designated address, an FIFO memory for successively storing only a prescribed number of addresses of a fetched instruction temporarily, and outputting in first in first out manner, and selecting means responsive to said write/read control signal attaining the value indicating the update request, for applying the output from said FIFO memory to said branch prediction information buffer, and otherwise, applying an address of a current instruction fetch to said branch prediction information buffer; whereby when a branch prediction is missed, said branch prediction information buffer storing the prediction information at an address output from said FIFO memory, and at a time of output of the prediction information, provides the branch information from an address of a current instruction fetch.

19. A branch predicting apparatus in a processor of a pipelined architecture, comprising:

program relative instruction immediate value storing means for storing, when a branch instruction of a program counter relative is executed, an immediate value of an offset of the program counter by said branch instruction in association with an address of a instruction having a prescribed relation with said branch instruction;

means for reading, simultaneously with next fetching of said instruction, an immediate value if any, which is stored in said program relative instruction immediate value storing means associated with the address of said instruction; and branch predicting means responsive to the immediate value being read from said program relative instruction immediate value storing means, for predicting direction of branching of the branch instruction associated with the fetched instruction in accordance with a prescribed scheme, and for performing branch target prediction by using said read immediate value.

20. A branch predicting apparatus in a processor of a pipelined architecture, comprising:

branch prediction information storing means for storing branch prediction information associated with an address of an instruction having a prescribed relation with a branch instruction when said branch instruction is executed, said branch prediction information including calculation method specifying information for specifying a method of calculating branch target of said branch instruction, and branch target calculation information used for calculating branch target in executing the branch instruction;

means for reading branch prediction information, if any, which is stored in said branch prediction information storing means associated with the address of the instruction, simultaneously with fetching of said instruction; and branch predicting means responsive to branch prediction information being read from said branch prediction information storing means for predicting a direction of branching in accordance with a prescribed scheme, and for predicting a branch target of the branch instruction associated with the fetched instruction by performing calculation on the branch target calculation information of said read branch prediction information, in accordance with a method of calculation specified by the calculating method specifying information of said read branch prediction information.

21. The branch predicting apparatus according to claim 20, wherein said processor of the pipelined architecture includes register means for storing a result of operation;

said calculating method specifying information specifies either a program counter relative branch or a register reference branch;

said branch target calculating information is either an immediate value of an offset of a program counter at the time of program counter relative branch or information for specifying register means; and said branch predicting means predicts branch target address by adding the immediate value of said read branch target calculating information to the program counter when the method of calculation specified by said read calculating method specifying information is the program counter relative branch, and predicts the branch target address in accordance with a content of the register means specified by said read branch target calculating information, when said method of calculation specified by said read calculating method specifying means is the register reference branch.

22. A branch predicting apparatus in a processor of a pipelined architecture, comprising:

a plurality of registers each storing prediction information related to branch prediction of a branch instruction, said prediction information indirectly indicating data to be referenced in execution of a branch instruction;

specifying information supplying means for supplying specifying information for specifying one of said plurality of registers that stores branch prediction information of a branch instruction, at a same timing as fetching of an instruction fetched before said branch instruction; and branch predicting means for reading the branch predicting information of said branch instruction from that one of said plurality of registers which is specified by the specifying information supplied from said specifying information supplying means, performing branch prediction of said branch instruction by, at the latest, completion of a fetch cycle of said branch instruction, and for outputting a branch predicting signal used in prefetching instructions to be executed subsequent to the branch instruction.

* * * * *